US011008968B2

(12) United States Patent
Ulrey et al.

(10) Patent No.: US 11,008,968 B2
(45) Date of Patent: May 18, 2021

(54) METHOD AND SYSTEM FOR VARIABLE DISPLACEMENT ENGINE DIAGNOSTICS

(71) Applicant: Ford Global Technologies, LLC, Dearborn, MI (US)

(72) Inventors: Joseph Ulrey, St. Joseph, MI (US); Russell Senior, Linden, MI (US); Gregory McConville, Ann Arbor, MI (US); Amey Karnik, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

(21) Appl. No.: 15/963,863

(22) Filed: Apr. 26, 2018

(65) Prior Publication Data

US 2019/0331049 A1 Oct. 31, 2019

(51) Int. Cl.
*F01L 1/34* (2006.01)
*F02D 41/22* (2006.01)
*F02D 41/00* (2006.01)
*F01L 13/00* (2006.01)

(52) U.S. Cl.
CPC ........ *F02D 41/221* (2013.01); *F01L 13/0005* (2013.01); *F02D 41/0087* (2013.01); *F01L 2013/001* (2013.01)

(58) Field of Classification Search
CPC .............. F02D 41/221; F02D 41/0087; F01L 13/0005; F01L 2013/001
See application file for complete search history.

(56) References Cited

U.S. PATENT DOCUMENTS

| 6,499,451 B1 | 12/2002 | Hendriksma et al. |
| 6,917,203 B1 | 7/2005 | Perotti et al. |
| 7,387,018 B2 | 6/2008 | Wiles |
| 9,016,252 B2 | 4/2015 | Zurface et al. |
| 9,194,261 B2 * | 11/2015 | McCarthy, Jr. ........... F01L 1/18 |
| 9,410,492 B2 | 8/2016 | Miyaki |
| 9,458,778 B2 | 10/2016 | Rayl et al. |
| 2007/0266973 A1 | 11/2007 | Lancefield et al. |

(Continued)

FOREIGN PATENT DOCUMENTS

| EP | 1577544 A2 | 9/2005 |
| EP | 2050933 A1 | 4/2009 |
| WO | 2016028824 A1 | 2/2016 |

OTHER PUBLICATIONS

Ulrey, J. et al., "Method and System for Variable Displacement Engine Diagnostics," U.S. Appl. No. 15/963,835, filed Apr. 26, 2018, 119 pages.

(Continued)

*Primary Examiner* — Zelalem Eshete
(74) *Attorney, Agent, or Firm* — Geoffrey Brumbaugh; McCoy Russell LLP

(57) ABSTRACT

Methods and systems are provided for diagnosing a cylinder valve deactivation mechanism in an engine system having cam-actuated valves. Movement of a latch pin of the deactivation mechanism is inferred from an induction current generated by a solenoid coupled to the latch pin, and the inferred movement is used to diagnose operation of cylinder valve deactivation mechanism. The inferred movement and a profile of the induction current is also used to estimate camshaft and crankshaft timing for improved cylinder fuel delivery in the absence of a camshaft sensor.

18 Claims, 17 Drawing Sheets

(56) References Cited

U.S. PATENT DOCUMENTS

2009/0228167 A1   9/2009   Waters et al.
2013/0312506 A1   11/2013  Nielsen et al.
2017/0058798 A1   3/2017   De Boer
2017/0183982 A1   6/2017   Hughes et al.

OTHER PUBLICATIONS

McConville, G. et al., "Method and System for Variable Displacement Engine Diagnostics," U.S. Appl. No. 15/963,893, filed Apr. 26, 2018, 114 pages.
Shelby, M. et al., "Method and System for Variable Displacement Engine Diagnostics," U.S. Appl. No. 15/963,930, filed Apr. 26, 2018, 113 pages.

* cited by examiner

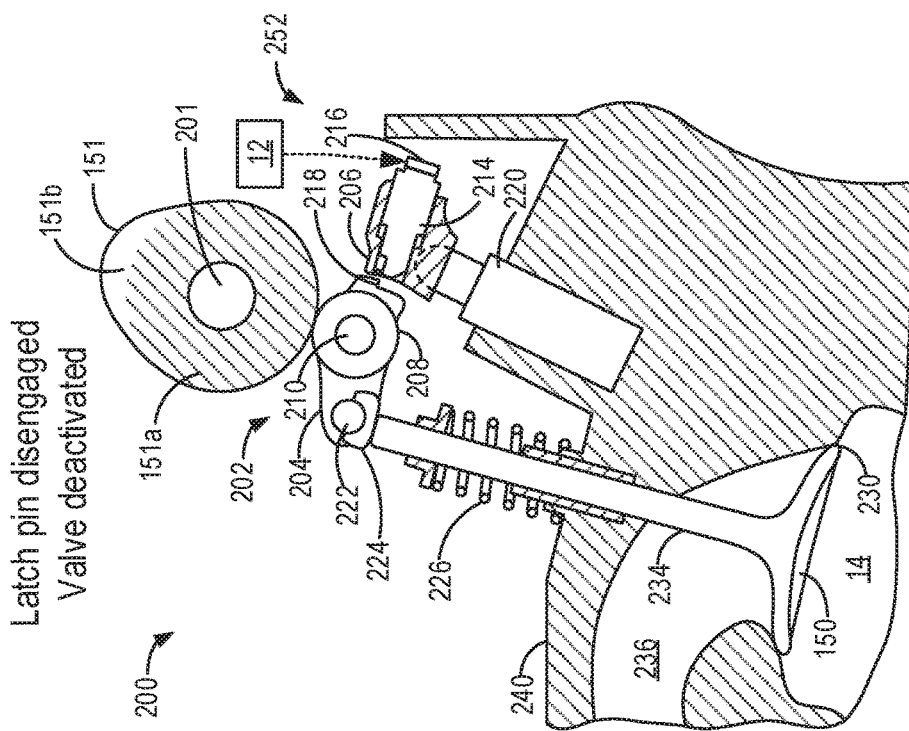
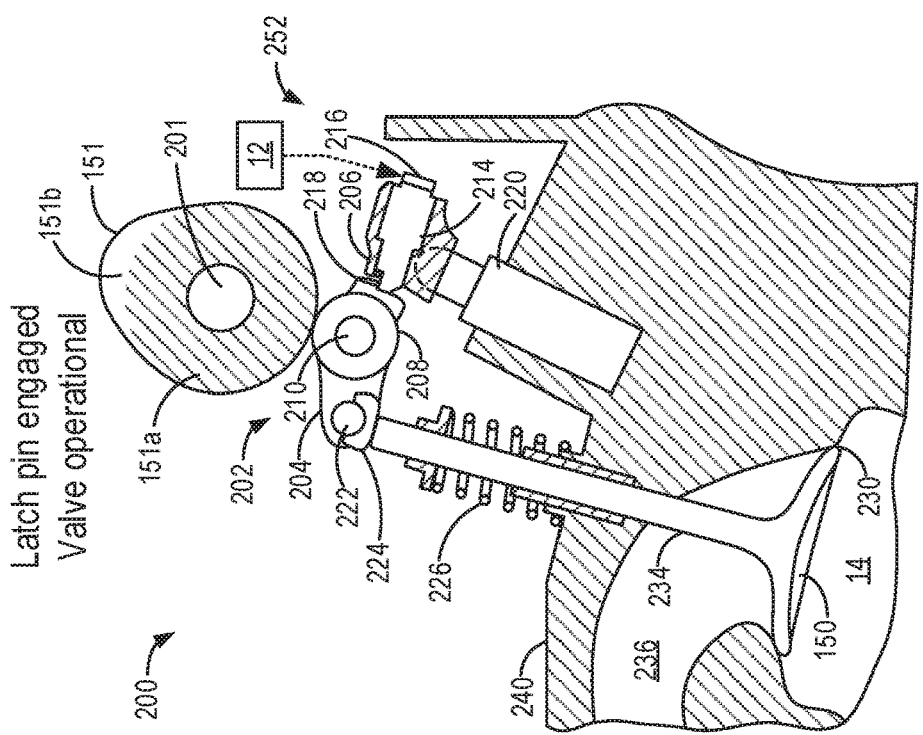
FIG. 2A
FIG. 2B

| Cam position | Latch pin movable? | Latch pin position | Valve operational? |
|---|---|---|---|
| Base circle | Yes | Engaged | Yes |
| Base circle | Yes | Disengaged | No |
| Lobe | No | Engaged | Yes |
| Lobe | No | Disengaged | No |

FIG. 3

METHOD AND SYSTEM FOR VARIABLE DISPLACEMENT ENGINE DIAGNOSTICS

FIELD

The present application relates to methods and systems for monitoring actuation of a cylinder valve deactivation mechanism in a variable displacement engine (VDE).

BACKGROUND/SUMMARY

Engines operating with a variable number of active or deactivated cylinders, also referred to as variable displacement engines (or VDE), may be used to increase fuel economy while optionally maintaining an overall exhaust mixture air-fuel ratio about stoichiometry. In some examples, half of an engine's cylinders may be disabled during selected conditions, where the selected conditions can be defined by parameters such as a speed/load window, vehicle speed, etc. In still other examples, cylinders may be individually and selectively deactivated.

A VDE control system may disable selected cylinders through the control of a plurality of cylinder valve deactivators that affect the operation of the cylinder's intake and exhaust valves. Various mechanisms may be used to enable cylinder deactivation. One example of a cylinder deactivation mechanism includes hydraulically actuated latches coupled to rocker arm assemblies to implement zero valve lift and cylinder deactivation. For example, switching roller finger followers (SRFF) may use hydraulically actuated latches. In these systems, hydraulic pressure (such as pressurized oil from an oil pump) may be used for latch actuation. One example valve deactivation mechanism is shown by Hughes et al in US 20170183982. Therein, valve operation is adjusted via a rocker arm assembly that includes a latch pin mounted on a rocker arm. The latch pin is actuated via an electromagnet. Movement of the latch pin into or out of the rocker arm assembly affects an activation state of the corresponding valve.

The inventors herein have recognized that cylinder valve deactivation mechanisms need to be periodically diagnosed to ensure that the fuel economy benefits of operating in a VDE mode can be extended. In addition, valve operation in deactivatable cylinders may need to be diagnosed to ensure proper switching between active cylinder and deactivated cylinder modes. Diagnostic methods that enable the cylinder valve deactivation mechanism to be directly assessed while switching the cylinder between active and deactivated states are particularly beneficial. However, one issue with such a diagnostic is that it requires the engine to be transitioning states, such as where a given cylinder is activated or deactivated. Since the transitioning is based on engine speed-load conditions, which continually change over the course of a drive cycle, there may be extended periods of a drive cycle where there is no VDE transition. Consequently, the opportunities for performing the diagnostic may be limited. If a VDE mode is actively enforced during the drive cycle to complete a diagnostic, engine performance may be affected. For example, if a VDE mode is imposed at high load conditions, torque demand may not be met. In addition, it may not be possible to complete the diagnostic at high engine speeds due to insufficient time being available to actuate the cylinder valve deactivation mechanism.

In one example, the issues described above may be addressed by a method for an engine comprising: latching and unlatching an electrically-actuated latch pin of a cylinder valve deactivation mechanism coupled to a valve of a cylinder as engine load varies; and indicating degradation of the cylinder valve deactivation mechanism based on inferred latch pin movement during the latching and unlatching. In this way, VDE diagnostics may be completed without intrusively changing a VDE state of the engine.

As one example, an engine system may include cylinders having valves that are selectively deactivatable via a cylinder deactivation mechanism that includes a latch pin mounted on a rocker arm assembly. On a given drive cycle, as engine speed and loads change responsive to driver torque demand, the engine may be continuously varied between various VDE and non-VDE states by adjusting cylinder deactivation mechanisms coupled to individual cylinders. For example, when the engine load drops below a threshold, an engine controller may apply a voltage pulse to energize a solenoid coupled to the latch pin to move the latch pin out of the rocker arm assembly, thereby deactivating the corresponding cylinder valve (and moving to a VDE state). Likewise, when engine load rises above the threshold, the engine controller may apply the voltage pulse to energize the solenoid coupled to the latch pin to move the latch pin into the rocker arm assembly, thereby reactivating the corresponding cylinder valve (and moving to a non-VDE state). Latch pin movement during the latching and unlatching may be inferred based on a measured electric current signature, which may include a number and (relative) position of peaks and valleys in the electric current signature, as well as slope of the current. For example, the presence of latch pin movement may be inferred from a signature that includes a temporary current decrease (e.g., to a valley) as voltage is applied (e.g., a change in the slope of the current). Based on the presence or absence of latch pin movement, the cylinder valve deactivation mechanism may be diagnosed. For example, the solenoid may be energized when the cam is at the base circle, and so the latch pin is expected to be able to freely move between active and deactivated positions. Thus, if latch pin movement is not observed while at this position, it may be inferred that the mechanism is degraded. Accordingly, appropriate mitigating actions may be undertaken based on whether cylinder valve is active or deactivated when the degradation is inferred.

In this way, by correlating the electric current signature of a solenoid to the movement of a latch pin, a cylinder valve deactivation mechanism may be reliably diagnosed. The technical effect of performing the diagnostic while an engine speed-load is changing is that the diagnostic can be completed non-intrusively. By completing the VDE diagnostic, the likelihood of engine error states (such as misfires) that may be triggered by a degraded VDE mechanism are reduced. By performing the diagnostic non-intrusively, the likelihood of completing the diagnostic on a drive cycle is improved. By timely diagnosing a VDE mechanism, the fuel economy benefits of cylinder deactivation can be extended over a large range of engine operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-2D shows an electric latch rocker arm mechanism that may be included in a valve deactivation mechanism.

FIG. 3 is a table summarizing a relationship between cam timing, latch pin position, valve state, and an ability of the latch pin to move.

DETAILED DESCRIPTION

Figure 1:
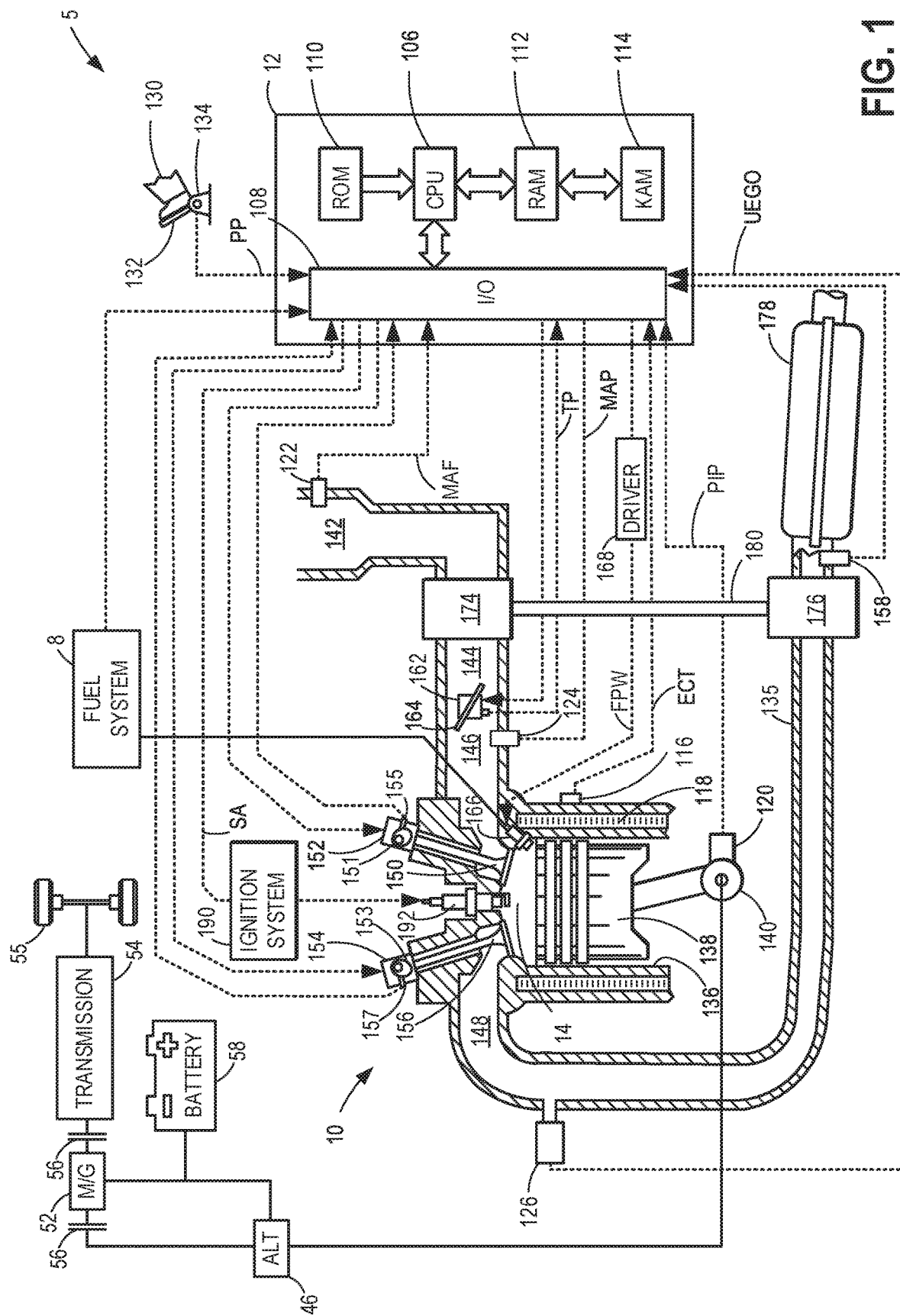
FIG. 1 shows a schematic depiction of an engine system of a vehicle.

The following description relates to systems and methods for controlling a cylinder valve deactivation mechanism of an engine, such as the engine system of FIG. 1. The cylinder valve deactivation mechanism may comprise an electric latch rocker arm mechanism, such as the electric latch rocker arm mechanism depicted in FIGS. 2A-2D. For example, by actuating a latch pin of the valve deactivation mechanism between an engaged position and a disengaged position via energization of an associated solenoid, the corresponding cylinder valve may be switched between an active and a deactivated state, as summarized in the table of FIG. 3. For example, the latch pin position, and therefore the valve state, may be changed during an engine startup or shutdown, such as according to the method of FIG. 4 and illustrated with respect to FIG. 11, and during transitions to and from a variable displacement engine (VDE) mode of operation, such as according to the method of FIG. 5. However, the latch pin is only moveable when the rocker arm is unloaded, such as when a corresponding cam is engaged with a cam follower while the cam is on its base circle. Furthermore, movement of the latch pin may be detected based on an inductive signature of the associated solenoid during the energization. Based on the movement (or lack thereof) of the latch pin and the cam position during the energization, degradation of the cylinder valve deactivation mechanism may be detected, such as according to the methods of FIGS. 6A-6B and 7 and as illustrated with respect to FIGS. 12 and 13. Further still, the movement (or lack thereof) of the latch pin during the solenoid energization may be combined with engine signals, such as the engine signals illustrated in FIG. 8, to determine camshaft and/or crankshaft position, such as according to the methods of FIGS. 9 and 10 and as illustrated with respect to FIGS. 14 and 15. In this way, the electric latch rocker arm mechanism may enable valve deactivation to be precisely controlled as a desired valve state changes, used to determine or confirm crankshaft and/or camshaft position, and diagnosed for degradation.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal TP from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively. In other examples, camshaft position sensors 155 and 157 may be omitted, as further described with respect to FIGS. 9 and 10.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative embodiments, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. Examples of such systems will be described with respect to FIGS. 2A-2D. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one embodiment, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate embodiments, a single VDE actuator may control deactivation of both intake and exhaust valves of the cylinder. In still other embodiments, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternative example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Hall effect sensor 120 may be configured as a crankshaft position sensor. For example, Hall effect sensor 120 may be configured to monitor a toothwheel having teeth placed at equal angle increments, such as 6 degrees, that rotates with crankshaft 140. Each time a tooth passes, the voltage output of Hall effect sensor 120 may switch from near zero voltage (off) to maximum voltage (on) in a square wave, as illustrated with respect to FIG. 8. The output of Hall effect sensor 120 enables controller 12 to determine the relative angle of crankshaft 140 as it turns. Typically, there are one or more missing teeth at a defined location on the toothwheel. The missing teeth may align with a specific crankshaft position, such as cylinder 1 top dead center (TDC). After the missing teeth have passed Hall effect sensor 120 for a first time during an engine starting event, an absolute position of crankshaft 140 may be known. Prior to that time, controller 12 is able to detect changes in position and crankshaft speed based on the output of Hall effect sensor 120, but is unable to determine the absolute position of the crankshaft. The orientation of the crankshaft prior to starting the engine can vary, and therefore the angular rotation of the crankshaft prior to the observation of the missing teeth also varies.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders, as further described with respect to FIG. 5.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and deactivating respective intake and exhaust valves 150 and 156. While fuel injectors of the disabled cylinders are turned off, the remaining enabled cylinders continue to carry out combustion, with corresponding fuel injectors and intake and exhaust valves active and operating. To meet overall engine torque requirements, the engine produces a greater amount of torque in each of the remaining active cylinders than was produced with all of the cylinders carrying out combustion. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Turning now to FIGS. 2A-2D, a partial, cutaway side view of a valvetrain 200 is shown. Valvetrain 200 may control intake and exhaust valve operation in an engine, such as engine 10 of FIG. 1. As such, like components of FIG. 1 and FIGS. 2A-2D are numbered the same and may not be reintroduced. Specifically, the view shown in FIGS. 2A-2D depicts an electric latch (herein also referred to as "e-latch") rocker arm mechanism 202 included in valvetrain 200 for operating and deactivating intake valve 150 of one cylinder of an engine. While valvetrain 200 will be described with respect to operating intake valve 150, the description is not limited to operating intake valve 150. For example, exhaust valve 156 of FIG. 1 and any other engine intake and/or exhaust valves may be operated similarly.

E-latch rocker arm mechanism 202 conveys radial information from a lobe of cam 151 into linear motion of intake valve 150. For example, based on a lift profile of cam 151, e-latch rocker arm mechanism 202 lifts intake valve 150 from a valve seat 230 to selectively open and close an intake port 236 of combustion chamber 14 defined in a cylinder head 240. E-latch rocker arm mechanism 202 includes an inner arm 204 and an outer arm 206. A cam follower 208 may be mounted to inner arm 204 via bearings and a rocker arm shaft 210. Cam follower 208 is configured to engage cam 151 as it is rotated by a camshaft 201. Cam follower 208 is shown as a roller follower (such as a switching roller finger follower, SRFF), but may alternatively be any other type of cam follower, such as a slider. Cam 151 includes a base circle 151a (shaded region), and a lobe 151b (unshaded region), in which a radius between the circumference of cam 151 and the center of camshaft 201 is variable and greater than that of base circle 151a. When cam follower 208 is engaged with cam 151 on base circle 151a, intake valve 150 is closed (e.g., not lifted). When cam follower 208 is engaged with cam 151 on lobe 151b, intake valve 150 is lifted from valve seat 230, as further described below. A position on lobe 151b is referred to as lift herein.

Figure 2D:
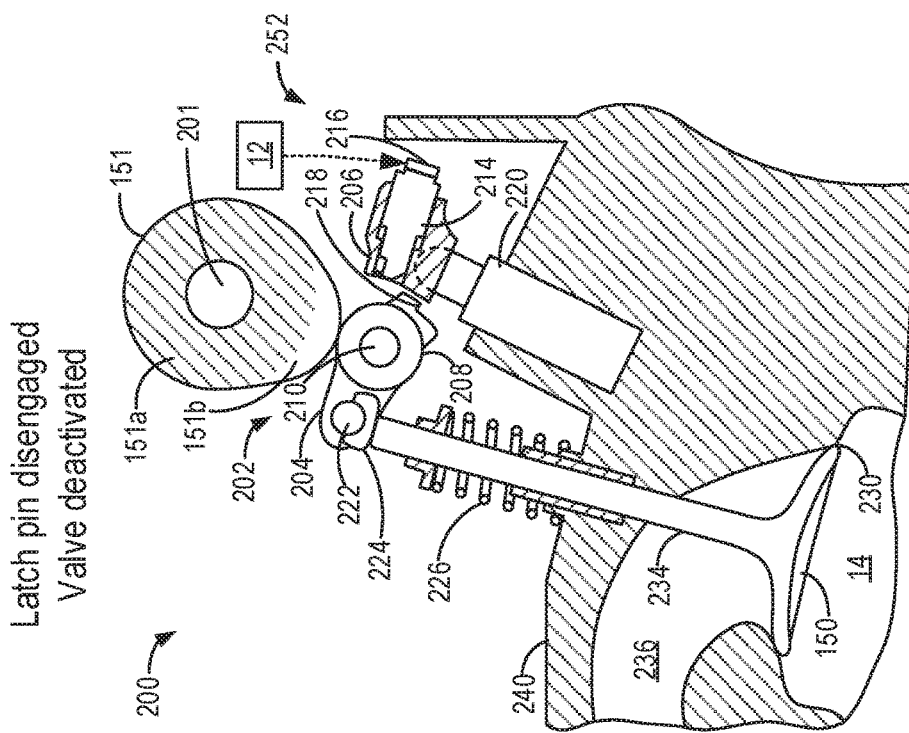
Figure 2C:
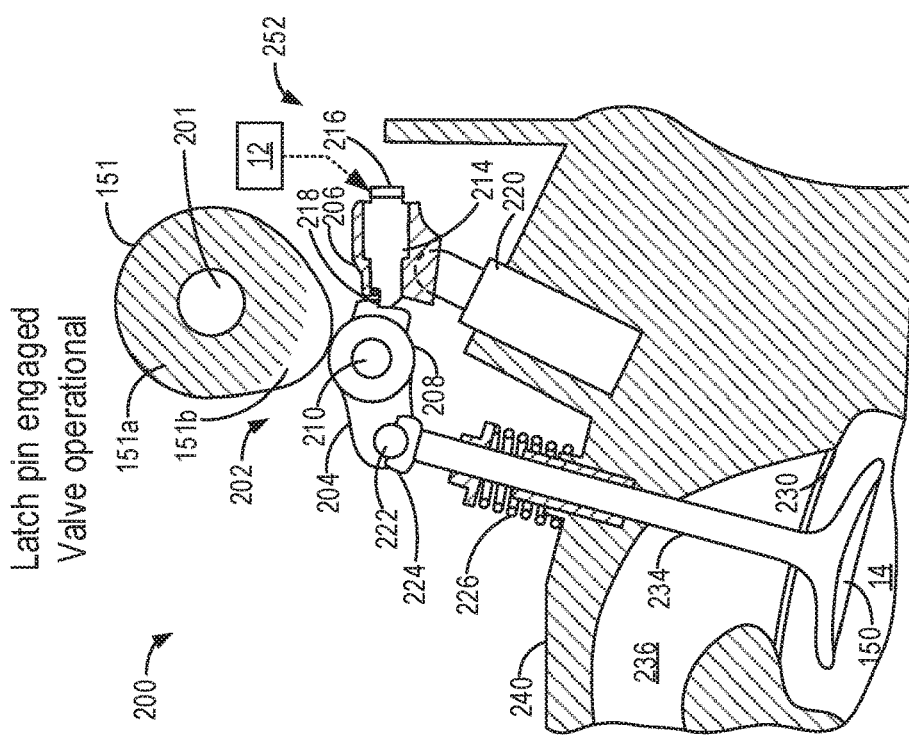

A latch pin 214 mounted in outer arm 206 may engage a lip 218 of inner arm 204, after which inner arm 204 and outer arm 206 are constrained to move in concert. A valve lash adjuster 220 may engage outer arm 206 and provide a fulcrum on which inner arm 204 and outer arm 206 pivot together as a unit when latch pin 214 is engaged. Latch pin 214 is translatable between an engaged position (also referred to as an active or latched position), as shown in FIGS. 2A and 2C, and a disengaged position (also referred to as a deactivated or unlatched position), as shown in FIGS. 2B and 2D. In the disengaged position, latch pin 214 no longer engages (e.g., contacts) lip 218 of inner arm 204, thereby disengaging inner arm 204 from outer arm 206. When latch pin 214 is in the engaged position, intake valve 150 may be considered to be in an operational (e.g., active) state. When latch pin 214 is in the disengaged position, intake valve 150 may be considered to be deactivated, as further described below. Latch pin 214 may be switched between the engaged (latched) and the disengaged (unlatched) positions via actuation of a solenoid 216. Solenoid 216 may be an electromagnetic solenoid actuator having a coil that can generate a magnetic force when energized by current. Furthermore, latch pin 214 may be comprised of a magnetic material that is movable via magnetic field changes. For example, the latch pin may be at least partially comprised of iron. As such, latch pin 214 and solenoid 216 may be considered to be part of a cylinder valve deactivation mechanism 252.

In the example of FIGS. 2A-2D, the latching mechanism is bi-stable such that no holding current is needed to maintain latch pin 214 in either the engaged or disengaged position. For example, controller 12 may provide a short voltage pulse of a first polarity to energize solenoid 216 to move latch pin 214 from the engaged position (shown in FIG. 2A) to the disengaged position (shown in FIG. 2B). This action may also be referred to as unlatching the latch pin. Latch pin 214 may be held in the disengaged position by an integrated permanent magnet. Similarly, a short voltage pulse of second polarity, opposite of the first polarity, may be applied to energize solenoid 216 to move latch pin 214 from the disengaged position (shown in FIG. 2B) to the engaged position (shown in FIG. 2A), where latch pin 214 may be held by a different integrated permanent magnet. This action may also be referred to as latching the latch pin. In some examples, one or more travel stops may be included to prevent latch pin 214 from moving beyond the disengaged position and/or the engaged position.

For example, when solenoid 216 is energized, solenoid current begins to rise as the solenoid circuit inductance creates a magnetic force to move latch pin 214. The magnetic force produced is proportional to $$\left(\frac{I}{g}\right)^2,$$

where I is the current to the coil and g is an air gap between latch pin 214 and a magnet. As a velocity of latch pin 214 increases, a back (e.g., counter) electromotive force (EMF) is created in the solenoid circuit. The back EMF produces voltage that is opposite the applied voltage and is proportional to the velocity of latch pin 214. As a result, the current on the solenoid circuit decreases as latch pin 214 moves. Once latch pin 214 reaches the end of its travel, the motion ceases, as does the back EMF, resulting in a "valley" (e.g., local minimum) in the solenoid current signal. In some examples, a permanent magnet may be added to generate flux to hold latch pin 214 after it moves to the magnet. Due to the back EMF from the latch pin movement causing the solenoid current to decrease, termed an inductive signature, movement of latch pin 214 may be inferred based on the inductive signature (also referred to herein as an electric current signature) of solenoid 216 during the actuation.

In alternative examples, the latching mechanism may be mono-stable, in which latch pin 214 may be held in the engaged position by one or more springs and in the disengaged position by an integrated permanent magnet. For example, latch pin 214 may be moved to the disengaged position by supplying a higher current to solenoid 216, after which the current may be reduced to a holding current. Latch pin 214 may then be returned to the engaged position via one or more springs by de-energizing solenoid 216. As described further herein, movement of latch pin 214 between the engaged position and the disengaged position may be restricted to when cam 151 is on base circle (as shown in FIGS. 2A and 2B).

As shown in FIG. 2C, while latch pin 214 is engaged with lip 218 and cam 151 rises off of base circle 151a onto lobe 151b, outer arm 206 pivots against valve lash adjuster 220 while inner arm 204 presses down on valve stem 234 via an elephant's foot 224, compressing a valve spring 226 against cylinder head 240. As a result, intake valve 150 is lifted off of valve seat 230. A valve lift profile is determined by the shape of cam 151 (such as a shape of lobe 151b) and is a function of an angular position of camshaft 201. When cam 151 returns to base circle 151a, valve spring 226 pushes valve stem 234 against elephant's foot 224, causing inner arm 204 to raise, outer arm 206 to raise, and intake valve 150 to close, as shown in FIG. 2A.

In contrast, when latch pin 214 is disengaged from lip 218 and cam 151 rises off of base circle 151a onto lobe 151b, cam 151 drives inner arm 204 downward via cam follower 208, as shown in FIG. 2D. For example, cam 151 may be at or near the maximum lift position. Instead of compressing valve spring 226, inner arm 204 pivots on a shaft 222 while outer arm 206 remains stationary, decoupled from inner arm 204 and cam follower 208. Intake valve 150 remains against valve seat 230, and intake port 236 of cylinder 14 remains closed. When cam 151 returns to base circle 151a, inner arm 204 may pivot back to its starting position (e.g., the position shown in FIG. 2B) via a lost motion spring or springs (not shown). The lost motion springs may be coil springs, torsion springs, or any suitable device to ensure the inner arm returns to a position where lip 218 is above the edge of latch pin 214 so that the latch pin is clear to move to the latched position. By actuating latch pin 214 to the disengaged position, intake valve 150 is deactivated even while cam 151 is on lobe 151b and has lift.

FIGS. 2A-2D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning to FIG. 3, table 300 depicts a relationship between cam timing, latch pin position, valve state, and an ability of the latch pin to move. The relationship depicted at table 300 may be leveraged by an engine controller to accurately and reliably diagnose a cylinder valve deactivation mechanism.

As indicated at 302-304, when the cam position is at base circle (e.g., base circle 151a, as shown in FIGS. 2A-2B), that is, when the cam is rotated such that a corresponding cam follower (e.g., cam follower 208 of FIGS. 2A-2D) is engaged with the base circle of the cam, the latch pin is moveable. That is, if the latch pin is actuated by energizing a corresponding solenoid, the latch pin can be latched into an engaged position (row 302) or unlatched into a disengaged position (row 304). When the latch pin is engaged, the corresponding cylinder valve is active, and the valve will induct air through the cylinder when lifted. As a result, the corresponding cylinder is active, and if all of the engine cylinders are active, the engine is in a non-VDE mode. In comparison, when the latch pin is disengaged, the corresponding cylinder valve is deactivated, and the valve will remain closed and will not induct air through the cylinder. As a result, the corresponding cylinder is deactivated, and the engine is in a VDE mode. As elaborated with reference to FIGS. 4-7 and 9-10, an engine controller may monitor for latch pin movement while the latch pin is latched or unlatched (e.g., actuated between the engaged and disengaged positions). The latch pin movement may be inferred based on an electric current signature of the associated solenoid. If latch pin movement is not detected when the latch pin is actuated while the cam is at the base circle position, it may be inferred that the cylinder valve deactivation mechanism is degraded. In particular, it may be inferred that the latch pin did not move due to a temporary malfunction such as a hydraulic lash adjuster that has pumped up, preventing an unlatched pin from re-engaging the inner arm, or a permanent malfunction such as a latch pin that has seized due to contamination between the outer arm (e.g., a pin bore of the outer arm) and the latch pin.

As indicated at 306-308, when the cam position is at a lobe position (e.g., lobe 151b, as shown in FIGS. 2C-2D), that is, when the cam follower is engaged with the cam off of base circle, the latch pin is not moveable. That is, if the latch pin is actuated by energizing the corresponding solenoid while in the engaged position, the latch pin cannot be unlatched into a disengaged position because the load from the inner arm on the latch pin creates friction that cannot be overcome by the force of the solenoid (row 306). Likewise, if the latch pin is actuated by energizing the corresponding solenoid while in the disengaged position, the latch pin cannot be latched into the engaged position because the pin will be stopped by the lip of the inner arm hitting the tip of the latch pin (row 308). When the latch pin is engaged, the corresponding cylinder valve is active, and the valve will induct air through the cylinder. As a result, the corresponding cylinder is active, and if all of the engine cylinders are active, the engine is in a non-VDE mode. In comparison, when the latch pin is disengaged, the corresponding cylinder valve is deactivated, and the valve will not induct air through the cylinder. As a result, the corresponding cylinder is deactivated, and the engine is in a VDE mode. As elaborated with reference to FIGS. 4-7 and 9-10, an engine controller may monitor for latch pin movement while the latch pin is engaged or disengaged. The latch pin movement may be inferred based on an electric current signature of the associated solenoid. If latch pin movement is detected when the corresponding solenoid is energized while the cam is at the lobe position, it may be inferred that the cylinder valve deactivation mechanism is degraded. In particular, it may be inferred that the latch pin moved due to a collapsed lifter (e.g., low oil pressure) or a worn cam lobe. In one example, it may be inferred that the latch pin moved due to the cam remaining at the base circle position even when it was expected to be at the lobe position due to the cam lobe being worn.

Figure 4:
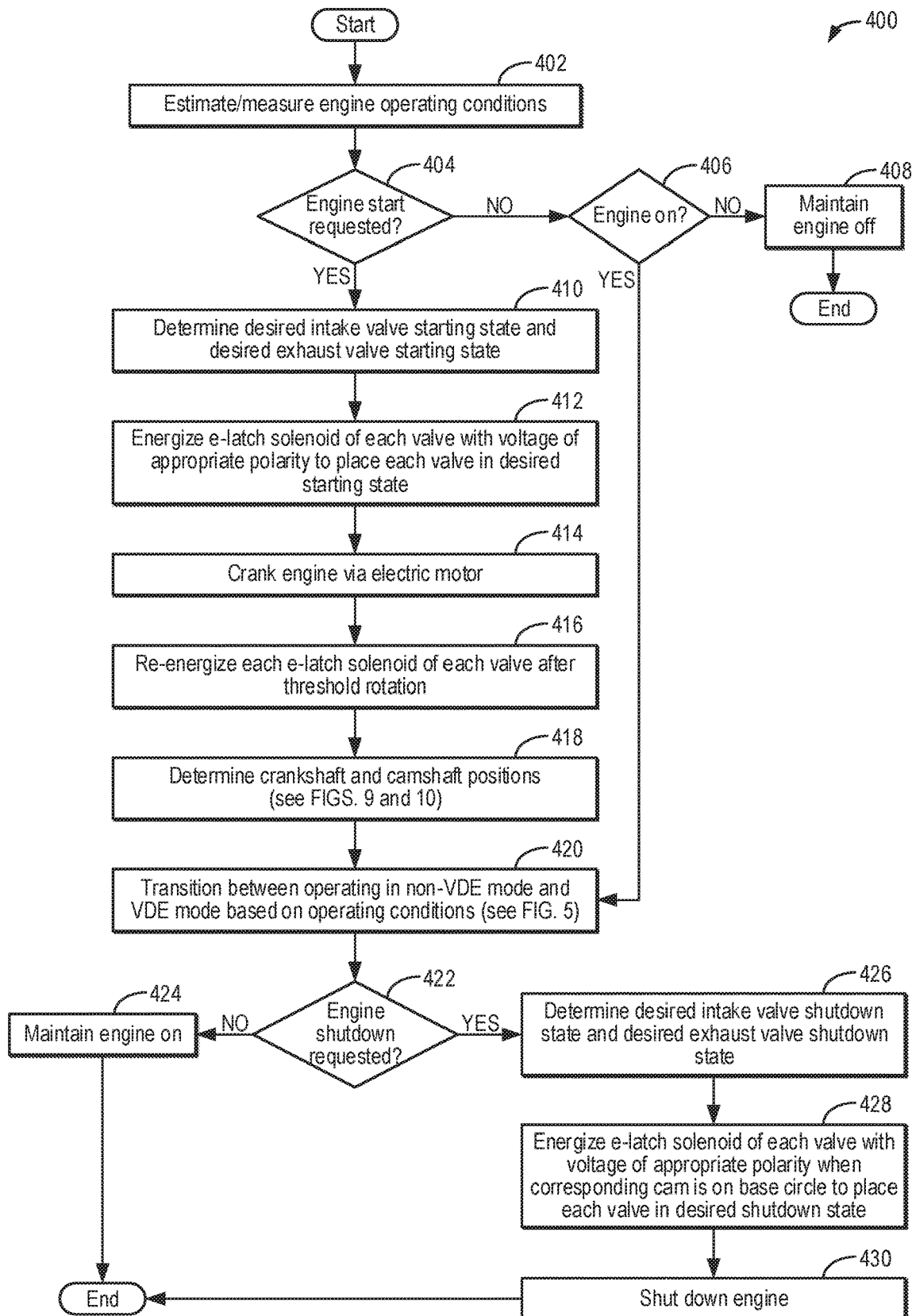
FIG. 4 shows a high-level flow chart of an example method for controlling cylinder valve operation during operation of a variable displacement engine.

Next, FIG. 4 shows an example method 400 for controlling operation of a VDE engine, such as engine 10 shown in FIG. 1, that includes the valve deactivation mechanism shown in FIGS. 2A-2D (e.g., valve deactivation mechanism 252). In particular, cylinder intake and exhaust valves may be put into a desired state (e.g., active or deactivated) during a starting operation of the engine, even if camshaft position is unknown and/or a current valve state is unknown, and during engine shutdown. Different starting and shutdown valve modes may facilitate engine spin up and spin down, respectively, such as by minimizing a cylinder air spring. Instructions for carrying out method 400 and the rest of the methods included herein may be executed by a controller (e.g., controller 12 of FIG. 1) based on instructions stored on the memory of the controller and in conjunction with signals received from sensors of the engine system, such as the sensors described above with reference to FIG. 1. The controller may employ engine actuators of the engine system, such as an e-latch rocker arm solenoid (e.g., solenoid 216 of FIGS. 2A-2D), to adjust engine operation according to the methods described below.

Method 400 begins at 402 and includes estimating and/or measuring engine operating conditions. The engine operating conditions may include, for example, engine speed, engine load, torque demand, engine temperature, exhaust temperature, air-fuel ratio, MAP, MAF, ambient conditions (such as ambient temperature, pressure, and humidity, etc.), a state of the engine, and an ignition state of the vehicle. The state of the engine may refer to whether the engine is on (e.g., operating at a non-zero speed, with combustion occurring within engine cylinders), off (e.g., at rest, without combustion occurring in the engine cylinders), or spun electrically (e.g., via torque from an electric motor, without combustion occurring in the engine cylinders. The ignition state of the vehicle may refer to a position of an ignition switch. As an example, the ignition switch may be in an "off" position, indicating that the vehicle is off (e.g., powered down, with a vehicle speed of zero), or in an "on" position, in which the vehicle is on (e.g., with power supplied to vehicle systems). The state of the engine and the state of the vehicle may be different. For example, the vehicle may be on and operating in an electric-only mode, in which an electric machine supplies torque to propel the vehicle and the engine is off and does not supply torque to propel the vehicle. As another example, the vehicle may be on with the engine shut off during an idle-stop. In one example, the vehicle may be at rest when the idle-stop is performed. In another example, the vehicle may be in motion (e.g., coasting) when the idle-stop is performed.

At 404, it is determined if an engine start is requested. For example, an engine start may be requested by a vehicle operator switching the ignition switch to an "on" position, such as by turning the ignition key, depressing an ignition button, or requesting an engine start from a remote device (such as a key-fob, smartphone, a tablet, etc.). In another example, an engine start may be requested by the controller to transition the vehicle from the electric-only mode to an engine mode in which combustion occurs in the engine and the vehicle is propelled at least partially by engine-derived torque. For example, the vehicle may be transitioned to the engine mode when a state of charge (SOC) of a system battery (e.g., system battery 58 of FIG. 1) drops below a threshold SOC. The threshold SOC may be a positive, non-zero battery SOC level below which the system battery may not be able to support or execute additional vehicle functions while propelling the vehicle via torque derived from the electric machine (e.g., 3010). As another example, the vehicle may be transitioned to the engine mode if torque demand rises above a threshold torque. The threshold torque may be a positive, non-zero amount of torque that cannot be met or sustained by the electric machine alone, for example. In still another example, the engine start may be requested by the vehicle controller to exit an idle-stop.

If an engine start is not requested, method 400 proceeds to 406 to determine if the engine is on (e.g., operating at a non-zero speed, with combustion occurring within one or more engine cylinders). If the engine is on, method 400 proceeds to 420, which will be described below. If the engine is not on (e.g., the engine is off), method 400 proceeds to 408 and includes maintaining the engine off. Following 408, method 400 ends.

If an engine start is requested at 404, method 400 proceeds to 410 and includes determining a desired intake valve starting state (e.g., of intake valve 150 of FIG. 1) and a desired exhaust valve starting state (e.g., of exhaust valve 156 of FIG. 1). The desired starting state of the intake valves and the exhaust valves may vary based on engine operating conditions, such as based on the engine temperature (e.g., whether the requested engine start is a warm start or a cold start), and may be different for the intake valves and the exhaust valves. For example, when the engine is warm (e.g., above a threshold temperature, the threshold temperature corresponding to a steady-state operating temperature), it may be desirable to avoid pumping air into a (warm) downstream catalyst (e.g., emission control device 178 of FIG. 1). Therefore, if it is desirable to spin the engine without pumping air, such as when the engine is warm, the desired starting state of the intake and exhaust valves may be deactivated. In another example, the desired starting state of the intake valves may be deactivated while the desired starting state of the exhaust valves may be active. Both of these examples will result in zero net airflow through the engine, but with a different torque signature. That is, deactivated intake valves with functioning exhaust valves will result in more net pumping losses and one air spring event per cylinder per engine cycle. Deactivating both the intake valve and the exhaust valve will result in two air spring events per engine cycle, but will have lower net pumping losses. In contrast, when the engine is cold, in one example, the desired starting state of both the intake and exhaust valves may be active. In still other examples, the desired starting state of the intake valves and the desired starting state of the exhaust valves may vary on a cylinder-by-cylinder basis. For example, when starting the engine in a reduced torque setting is desired, the desired starting state of the intake and exhaust valves of a subset of the cylinders may be deactivated (or desired starting state of just the intake valves may be deactivated) while the desired starting state of the intake and exhaust valves of a remaining number of cylinders may be active. Furthermore, a desired valve state during an engine shutdown may be different than the desired state for the engine start, as further described below, so the valves may be in a different state than the desired starting state when the engine start is requested.

At 412, method 400 includes energizing an e-latch solenoid of each valve with voltage of appropriate polarity to place each valve in the desired state (as determined at 410). For example, if the desired starting state is deactivated, the controller may energize the e-latch solenoid included in an e-latch rocker arm mechanism of the corresponding valve with a voltage pulse having a first polarity. As described with respect to FIGS. 2A-2D, the energization of the solenoid with the voltage pulse of the first polarity moves a latch pin coupling an outer arm of the e-latch rocker arm mechanism to an inner arm of the e-latch rocker arm mechanism (e.g., latch pin 214, outer arm 206, and inner arm 204 of FIGS. 2A-2D) from an engaged to a disengaged position. In particular, the movement of the latch pin from the engaged position (in which the inner arm and the outer arm pivot in concert to lift the corresponding valve when an associated cam rises off of base circle onto a lobe) to the disengaged position (in which the outer arm is no longer coupled to the inner arm and the corresponding cylinder valve cannot lift) deactivates the corresponding valve. If the latch pin is already in the disengaged position, then energizing the associated solenoid with the voltage pulse of the first polarity will not result in further latch pin movement. As another example, if the desired starting state is active, the controller may energize the e-latch solenoid of the e-latch rocker arm mechanism of the corresponding valve with a voltage pulse having a second polarity, which is opposite of the first polarity. As described with respect to FIGS. 2A-2D, the energization of the solenoid with the voltage pulse of the second polarity results in the latch pin moving from the disengaged to the engaged position. If the latch pin is already in the engaged position, then energizing the associated solenoid with the voltage pulse of the second polarity will not result in further latch pin movement. As such, the controller may command the desired valve state even if the current valve state is unknown.

As described with respect to FIGS. 2A-2D and summarized in the table of FIG. 3, latch pin movement may only occur during the energization when the associated cam is on the base circle. During the starting operation of the engine, a position of each cam during the energization may be unknown. Therefore, the latch pin of any valve with its cam off of the base circle will not move.

At 414, method 400 includes cranking the engine via an electric motor, such as a starter motor or an electric machine (e.g., electric machine 52 of FIG. 1). For example, electric power may be supplied to the electric motor, with the amount of power supplied corresponding to an amount of electric torque needed to crank the engine to a desired speed.

At 416, method 400 includes re-energizing the e-latch solenoid of each valve after a threshold rotation is reached. The threshold rotation corresponds to a maximum valve duration, such as a value between 200 and 280 degrees of crankshaft rotation. After the maximum valve duration, any cams that were previously off of the base circle (e.g., on the cam lobe), resulting in no latch pin movement during the energization at 412 (e.g., a first energization), will be returned to the base circle. Therefore, any latch pin that is not in the position corresponding to the desired valve starting state will be moved during the re-energization. Re-energizing the e-latch solenoid of each valve includes sending a second voltage pulse of a same polarity as during the first energization. Latch pins that previously moved during the first energization will remain in place, as will any latch pins that were already in the position corresponding to the desired starting state prior to the first energization. In this way, each valve may be reliably placed into its desired starting state in less than one engine revolution and without any prior knowledge of the cam position or the valve state. Furthermore, after placing each valve into the desired starting state, the current valve state is known.

At 418, method 400 includes determining crankshaft and camshaft positions, as will be described with respect to FIGS. 9 and 10. Briefly, after each valve state is known, the movement or lack of movement of a latch pin during a subsequent actuation provides information for inferring a stroke of the corresponding cylinder. For example, the intake valve latch pin will not move during the intake stroke, when the associated intake cam is on the lobe and an intake valve rocker arm is loaded, and the exhaust valve latch pin will not move during the exhaust stroke, when the associated exhaust cam is on the lobe and an exhaust valve rocker arm is loaded. Latch pin movement or lack of movement during the actuation may be determined based on an inductive signature of the corresponding e-latch solenoid. The inductive signature refers to the e-latch solenoid current generated during the energization. If the cam is on the base circle and the associated latch pin moves, the movement causes the current to momentarily decrease (e.g., a slope of the current changes), which appears as a valley in a trace of the solenoid current during the energization, as described with respect to FIGS. 2A-2D illustrated with respect to FIGS. 14-15. In contrast, when the cam is on the lobe and the associated latch pin does not move, the solenoid current will steadily increase without a valley until a maximum current is reached. In this way, the controller may determine which latch pins moved and which latch pins did not move based on the presence or absence of the current decrease in the inductive signature of the associated solenoid to provide information regarding the cam position. With the crankshaft and camshaft positions determined, fuel and spark may be provided in order to initiate combustion within the engine cylinders, with fuel injection and spark provided at timings relative to the determined crankshaft and camshaft positions.

At 420, method 400 includes transitioning between operating in a non-VDE mode and a VDE mode based on the operating conditions, as will be described with respect to FIG. 5. For example, the controller may make a determination of whether to operate in the non-VDE mode, in which combustion occurs in all cylinders of the engine, or the VDE mode, in which a subset of the cylinders are deactivated while combustion occurs in remaining cylinders, based on at least a torque demand. For example, the non-VDE mode may be selected when the torque demand is higher, and the VDE mode may be selected when the torque demand is lower. The engine may be transitioned between the non-VDE mode and the VDE mode multiple times over a drive cycle. The transitioning may include selectively deactivating (when transitioning to the VDE mode from the non-VDE mode) or reactivating (when transitioning to the non-VDE mode from the VDE mode) cylinder intake and exhaust valves, such as by energizing the e-latch solenoid of the corresponding valve deactivation mechanism to move the associated latch pin between the engaged and disengaged positions. The transitioning may also include selectively deactivating some cylinders and/or reactivating other cylinders when changing from one VDE mode to another VDE mode.

At 422, it is determined if an engine shutdown is requested. As one example, a shutdown request from the vehicle operator may be confirmed in response to the ignition switch being moved to the "off" position or by the vehicle operator depressing a push-button. As another example, the engine shutdown may be initiated by the controller, such as in response to idle-stop conditions being met and without receiving an operator request to stop the engine. Idle-stop conditions may include, for example, the battery SOC being more than the threshold SOC (e.g., as defined at 404), a vehicle speed being within a desired range (e.g., no more than 30 mph), no request for air conditioner operation, a driver requested torque being less than a predetermined threshold torque, a brake sensor status indicating that a brake pedal has been depressed, an engine speed being below a threshold engine speed, an input shaft rotation number being below a predetermined threshold rotation number, etc. In one example, the vehicle may be at rest when the idle-stop conditions are met. In another example, the vehicle may be in motion (e.g., coasting) when the idle-stop conditions are met. Any or all of the idle-stop conditions may be met for an idle-stop condition to be confirmed. As another example, the controller may initiate an engine shutdown to transition the vehicle to operating in the electric-only mode, such as when the battery SOC is greater than the threshold and the torque demand is less than the threshold torque.

If an engine shutdown is not requested, method 400 proceeds to 424 and includes maintaining the engine on. As such, combustion will continue to occur in one or more engine cylinders, with the engine operating at a non-zero speed. The method may then exit. If an engine shutdown is requested, method 400 proceeds to 426 and includes determining a desired intake valve shutdown state and a desired exhaust valve shutdown state. The desired shutdown state may be the same or different for the intake valves and the exhaust valves. Furthermore, the desired intake valve shutdown state and the desired exhaust valve shutdown state may vary from cylinder to cylinder. As a first example, the desired shutdown state for both the intake valves and the exhaust valves may be active for all cylinders (e.g., a conventional engine shutdown). In a second example, the desired shutdown state of both the intake and exhaust valves may be deactivated for all of the cylinders for zero net airflow through the engine and fewer air spring events. Deactivation of the intake and exhaust valves of every cylinder during shutdown may reduce the net engine pumping work and friction so that the engine spins longer, making the engine ready for a subsequent restart. As a third example, the desired shutdown state of the intake valves may be deactivated while the desired shutdown state of the exhaust valves may be active for all of the cylinders, which also results in zero net airflow through the engine. As a fourth example, the desired shutdown state of the intake and exhaust valves of a subset of the cylinders may be deactivated (or the desired shutdown state of just the intake valves may be deactivated) while the desired shutdown state of the intake and exhaust valves of a remaining number of cylinders may be active. The controller may determine the desired intake valve shutdown state and the desired shutdown state based on operating conditions, such as a temperature of the catalyst and whether a subsequent engine restart is anticipated. As such, the desired shutdown state may vary based on an origin of the shutdown request (e.g., the vehicle operator or the controller). As an example, the controller may input the operating conditions into one or more look-up tables, maps, or algorithms and output the corresponding desired intake and exhaust valve shutdown state for each cylinder. As another example, the controller may make a logical determination regarding the desired shutdown state of each intake and each exhaust valve based on logic rules that are a function of the operating conditions. As an example, the controller may select one of the second or third examples to avoid sending oxygen to the catalyst during shutdown when the catalyst temperature is higher. As another example, the controller may select the second example when a subsequent engine restart is anticipated, such as when the engine is being shut down for an idle stop.

At 428, method 400 includes energizing the e-latch solenoid of each valve with voltage of appropriate polarity when the corresponding cam is on base circle to place each valve in its desired shutdown state. As another example, only the e-latch solenoids corresponding to valves not already in their desired shutdown states may be energized. For example, if the desired shutdown state of the exhaust valves is deactivated, active exhaust valves will be deactivated by moving their latch pins to the disengaged position via energizing the corresponding e-latch solenoids with a voltage pulse of the first polarity when the associated cam is on base circle. If the cam position is unknown for any reason, the valves may be re-energized after the threshold rotation is reached, as described above at 416.

At 430, method 400 includes shutting down the engine. For example, shutting down the engine may include disabling fuel delivery and spark so that combustion no longer occurs within the engine cylinders and allowing the engine to spin to rest. Following 430, method 400 ends.

In this way, intake and exhaust valve activation state may be accurately and efficiently controlled via actuation of an e-latch rocker arm mechanism. The e-latch rocker arm mechanism enables the valves to be quickly placed into a desired starting state (e.g., active or deactivated) during an engine start without interaction with a camshaft positioning system and without knowledge of the current valve state.

The valves may also be placed into a desired shutdown state during an engine shutdown, which may be different than the desired starting state. The desired starting state and the desired shutdown state may facilitate engine spin up and spin down, respectively. Furthermore, the e-latch rocker arm mechanism enables the crankshaft and camshaft positions to be quickly determined as well as the transitioning of the engine between VDE and non-VDE modes of operation, increasing fuel economy. In some examples, such as when the current valve state is known, the controller may monitor for latch pin movement during each solenoid energization via an inductive signature of the solenoid, as further described herein. However, monitoring for latch pin movement is not necessary for setting the valves to the desired state, particularly when the current valve state is unknown (such as when an engine start is requested) and it is therefore unknown whether latch pin movement is expected or not.

Figure 5:
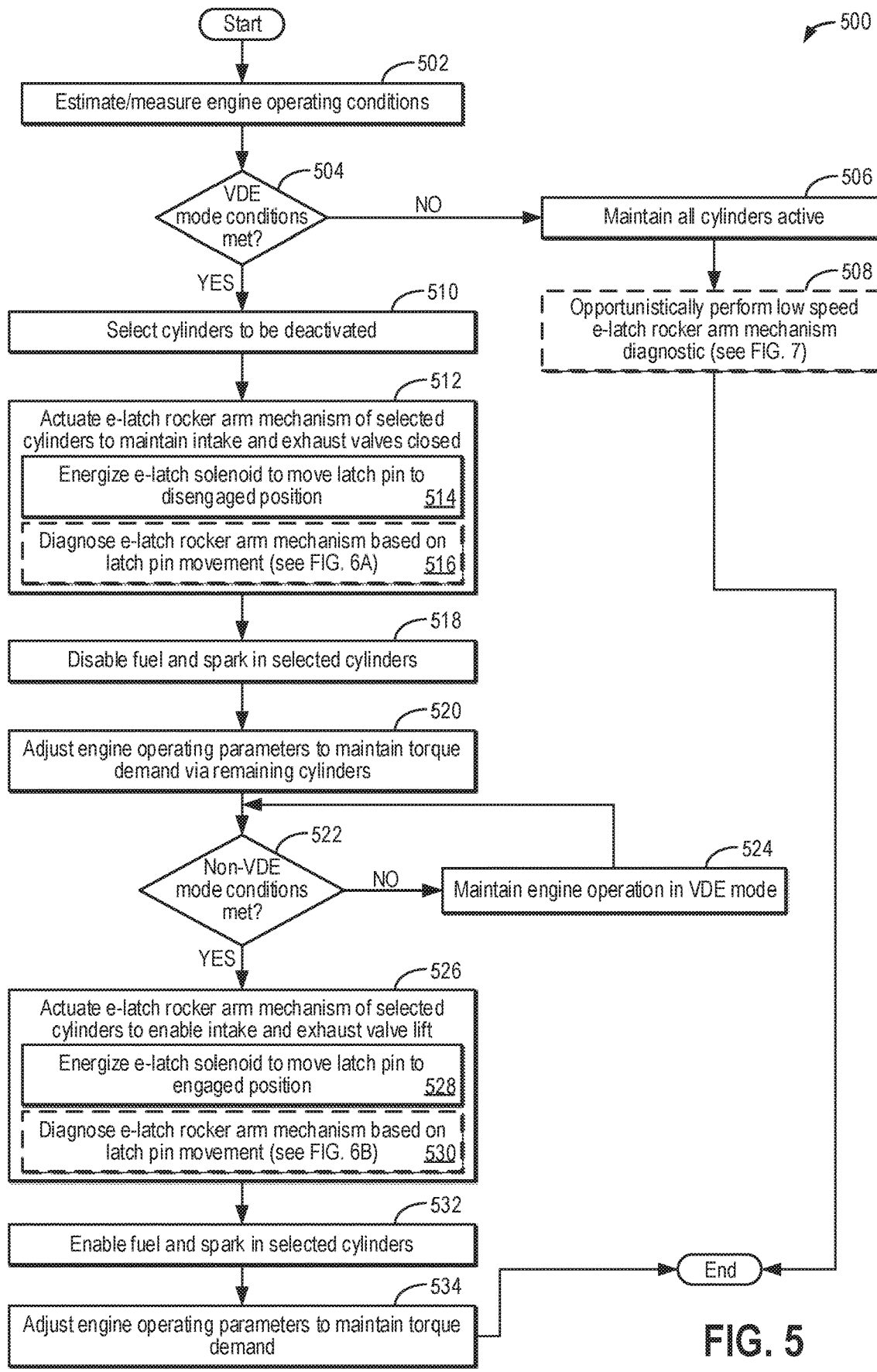
FIG. 5 shows a flow chart of an example method for deactivating and reactivating cylinder intake and exhaust valves during a transition to and from a VDE mode of operation using an electric latch rocker arm mechanism.

Turning now to FIG. 5, an example method 500 is shown for selectively deactivating cylinder valve actuation mechanisms responsive to engine operating conditions and diagnosing a cylinder valve actuator. Therein, cylinder valves may be selectively deactivated by actuating an electric latch (e-latch) rocker arm mechanism via energization of an associated electric solenoid (herein also referred to as an e-latch solenoid). The e-latch rocker arm mechanism may then be diagnosed based on latch pin movement during the actuation. The operating sequence of FIG. 5 may be produced via the system of FIGS. 1 and 2A-2D.

At 502, the method includes estimating and/or measuring engine operating conditions such as engine speed, engine load, driver torque demand, boost pressure, MAP, MAF, vehicle speed, engine temperature, ambient conditions (such as ambient temperature, pressure, and humidity), etc. At 504, it may be determined if the estimated engine conditions enable entry of the engine into a VDE mode where the engine can be operated with one or more cylinders selectively deactivated. In one example, VDE mode entry conditions may be met if the torque demand, or the vehicle speed, is below a threshold.

If VDE mode entry conditions are not met, at 506, the method includes maintaining all engine cylinders active and combusting fuel in all the cylinders. At 508, while operating in a non-VDE mode, the method includes opportunistically performing a low speed e-latch mechanism diagnostic, as elaborated at FIG. 7. Briefly, therein, the e-latch solenoid may be energized to actively and intrusively move a latch pin of the rocker arm mechanism between an engaged and disengaged position. The e-latch rocker arm mechanism is then diagnosed based on an inductive current signature generated during the energization. Following 508, method 500 ends.

If VDE entry conditions are met, at 510, the method includes selecting cylinders to be deactivated. This includes selecting a total number of cylinders to deactivate as well as an identity of the cylinders to be deactivated. In one example, the number of cylinders to be deactivated may increase as the driver torque demand decreases. For example, where an engine has two banks of cylinders, half the total number of engine cylinders may be deactivated by deactivating all cylinders of one bank while maintaining all cylinders of the other bank active. Alternatively, an equal number of cylinders may be deactivated from both banks. As another example, if the torque demand is lower, more than half of the cylinders may be deactivated, including cylinders from both banks.

In still other examples, the controller may determine a desired induction ratio based at least on operator torque demand. The engine cylinder induction ratio is an actual total number of cylinder firing events divided by an actual total number of cylinder intake strokes. In one example, the actual total number of cylinder intake strokes is a predetermined number. As used herein, a cylinder activation event refers to a cylinder firing with intake and exhaust valves opening and closing during a cycle of the cylinder, while a cylinder deactivation event refers to a cylinder not firing with intake and exhaust valves held closed during a cycle of the cylinder. An engine event may be a stroke of a cylinder occurring (e.g., intake, compression, power, exhaust), an intake or exhaust valve opening or closing time, a time of ignition of an air-fuel mixture in the cylinder, a position of a piston in the cylinder with respect to the crankshaft position, or other engine-related event. The engine event number corresponds to a particular cylinder. For example, engine event number one may correspond to a compression stroke of cylinder number one. Engine event number two may correspond to a compression stroke of cylinder number three. A cycle number refers to an engine cycle, which includes one event (activation or deactivation) in each cylinder. For example, a first cycle is completed when each cylinder of an engine has completed all four stroke events (intake, compression, expansion, and exhaust events), in the firing order. The second cycle starts when each cylinder of the engine starts another iteration of all four stroke events. The target or desired induction ratio may be determined from the operator requested engine torque. In particular, allowable engine cylinder induction ratio values may be stored in a table or function that may be indexed by desired engine torque and engine speed. Engine cylinder induction ratio values that may provide the requested engine torque may be part of a group of available engine cylinder induction ratio values. Then, the engine cylinder induction ratio that provides the fewest number of active engine cylinders during a cycle may be selected from the group of available engine cylinder induction ratio values to provide the desired engine cylinder induction ratio. In this way, a single desired engine cylinder induction ratio may be selected from a group of a large number of engine cylinder induction ratio. It will be appreciated that the selected engine cylinder induction ratio may then be provided via one of a plurality of possible cylinder deactivation patterns.

As one example, a target induction ratio of ½ (or 0.5) implies that for every 2 cylinder events, one cylinder is active or fired and one is deactivated or skipped. As another example, a target induction ratio of ⅓ (or 0.33) implies that for every 3 cylinder events, one cylinder is active and the remaining two are deactivated.

The controller may also select a cylinder pattern for deactivation that provides the desired induction ratio. As an example, an induction pattern for an induction ratio of ½ may include every other cylinder being selectively deactivated to produce half of the power, on average. Further, the same pattern may be applied for each consecutive engine cycle such that the same cylinders are skipped on consecutive engine cycles while the remaining cylinders are fired on each of the engine cycles. As another example, an induction pattern for an induction ratio of ⅓ may include two out of every three cylinders being selectively deactivated to produce a third of the power, on average. Further, the induction ratio may be provided by different cylinders being skipped on each engine cycle.

Once the cylinder pattern corresponding to the desired induction ratio is selected, the controller may disable fuel and spark and deactivate cylinder valve mechanisms in accordance with the selected cylinder pattern to provide the target induction ratio. The selective cylinder deactivation includes, for the selected cylinders to be deactivated, holding the cylinder valves closed, with no fuel injected into the cylinders, for an entire engine cycle of 720 crank angle degrees (that is, for all four strokes of a cylinder).

It will be appreciated that the decision to activate or deactivate a cylinder and open or close the cylinder's intake and exhaust valve may be made a predetermined number of cylinder events (e.g., one cylinder event, or alternatively, one cylinder cycle) before the cylinder is to be activated or deactivated to allow time to begin the process of opening and closing intake and exhaust valves of the cylinder. For example, for an eight cylinder engine with a firing order of 1-3-7-2-6-5-4-8, the decision to activate or deactivate cylinder number seven may be made during an intake or compression stroke of cylinder number seven one engine cycle before cylinder number seven is activated or deactivated. Alternatively, the decision to activate or not activate a cylinder may be made a predetermined number of engine events or cylinder events before the selected cylinder is activated or deactivated. In still further examples, the number of cylinder events may be adjusted based on hardware capabilities and current engine operating conditions.

At 512, the method includes actuating the e-latch rocker arm mechanism of the selected cylinders to maintain intake and exhaust valves of those cylinders closed. This includes, at 514, the controller sending a signal to energize the e-latch solenoid coupled to the e-latch rocker arm mechanism of the intake and exhaust valves of the selected cylinders. The timing of the signals to the intake and exhaust solenoids are selected to coincide with the associated cam being on base circle. The energization of the solenoid results in a change in the position of a latch pin (e.g., latch pin 214 of FIGS. 2A-2D) coupling an outer arm of the e-latch rocker arm mechanism to an inner arm of the e-latch rocker arm mechanism (e.g., outer arm 206 and inner arm 204 of FIGS. 2A-2D). In particular, energizing the e-latch solenoid with a voltage pulse of a first polarity moves the latch pin to a disengaged position where the outer arm is no longer coupled to the inner arm and the corresponding cylinder valve cannot lift. As described with respect to FIG. 2D, with the outer arm disengaged from the inner arm, the outer arm remains stationary while the inner arm pivots against a shaft instead of lifting the valve when an associated cam rises off of base circle. At 516, the method further includes, while transitioning to the VDE mode, opportunistically diagnosing the e-latch rocker arm mechanism based on latch pin movement during the actuation of the solenoid. As elaborated at FIG. 6A, the latch pin's motion during the energization of the associated solenoid is inferred via an inductive signature of current generated during the solenoid energization. By diagnosing the latch pin's motion when entry into the VDE mode has been commanded, the VDE mechanism is diagnosed non-intrusively and without relying on costly sensors. At 518, the method includes disabling fuel and spark to the selected cylinders. Fuel flow and spark to the deactivated cylinders may be stopped by deactivating cylinder fuel injectors (e.g., fuel injector 166 of FIG. 1) and disabling a spark signal commanded to a given cylinder's spark plug (e.g., spark plug 192 of FIG. 1). Alternatively, the method may not disable the spark signal since, even in the presence of spark, the cylinder will not be able to fire without fuel and air. As a result, the deactivated cylinders do not combust air and fuel therein and therefore do not produce any torque. At 520, the method includes adjusting engine operating parameters to maintain torque demand via remaining cylinders. The remaining active cylinders operate with a higher average cylinder load in the VDE mode (relative to the non-VDE mode) to meet the driver torque demand, increasing pumping efficiency and fuel economy of the engine. For example, one or more of airflow, spark timing, and cylinder valve timing may be adjusted in the remaining, active cylinders in order to maintain the engine torque demand and minimize torque disturbances during the transition to operating in the VDE mode.

At 522, it may be determined if engine operating conditions have changed to enable exit of the engine from the VDE mode and entry into the non-VDE mode where the engine can be operated with all cylinders active. In one example, non-VDE mode entry conditions (or VDE mode exit conditions) may be met if the torque demand, or the vehicle speed, is above a threshold.

If non-VDE mode entry conditions are not met, at 524, the method includes maintaining engine operation with one or more cylinders deactivated and combusting fuel in remaining active cylinders. Else, if non-VDE mode entry conditions are met, at 526, the method includes actuating the e-latch rocker arm mechanism of the selected cylinders to enable intake and exhaust valves of previously deactivated cylinders to lift. This includes, at 528, the controller sending a signal to energize the e-latch solenoid coupled to the e-latch rocker mechanism of the valves of the deactivated cylinders. The timing of the signals to the intake and exhaust solenoids are selected to coincide with the associated cam being on base circle. The energization of the solenoid results in a change in the position of the latch pin. In particular, energizing the e-latch solenoid with a voltage pulse of a second polarity, which is opposite of the first polarity, moves the latch pin to an engaged position where the outer arm is coupled to the inner arm and valve lift is possible. As described with respect to FIG. 2C, with the latch pin in the engaged position, the outer arm and inner arm move in concert, pivoting against a valve lash adjuster and lifting the valve based on a profile of the associated cam. At 530, the method further includes opportunistically diagnosing the e-latch rocker arm mechanism based on latch pin movement during the actuation of the solenoid. As elaborated at FIG. 6B, by monitoring the latch pin's motion via the inductive signature during the energization of the associated solenoid, the VDE mechanism can be reliably diagnosed in a non-intrusive manner. In particular, degradation of the e-latch rocker arm mechanism in which the latch pin is stuck in the deactivated position may be determined, enabling the controller to adjust engine operation accordingly to account for deactivation of the corresponding cylinder. Furthermore, a pumped up (e.g., overextended) lifter or worn cam lobe may be identified.

At 532, the method includes resuming fuel and spark in the previously deactivated cylinders. As a result, the reactivated cylinders start to combust air and fuel therein and therefore start to produce torque. At 534, the method includes adjusting engine operating parameters to maintain the torque demand. At this time, since all cylinders are active, each active cylinder may operate with a lower average cylinder load relative to the VDE mode to meet the driver torque demand. In some examples, one or more of airflow, spark timing, and cylinder valve timing may be adjusted in order to minimize torque disturbances during the transition to operating in the non-VDE mode. Additionally, as elaborated with reference to FIGS. 6A-6B, one or more engine operating parameters may be adjusted based on the outcome of the diagnostic, such as based on whether any of the cylinder valves are degraded (e.g., whether they are stuck opening or stuck closed). Following 534, method 500 ends.

Figure 6A:
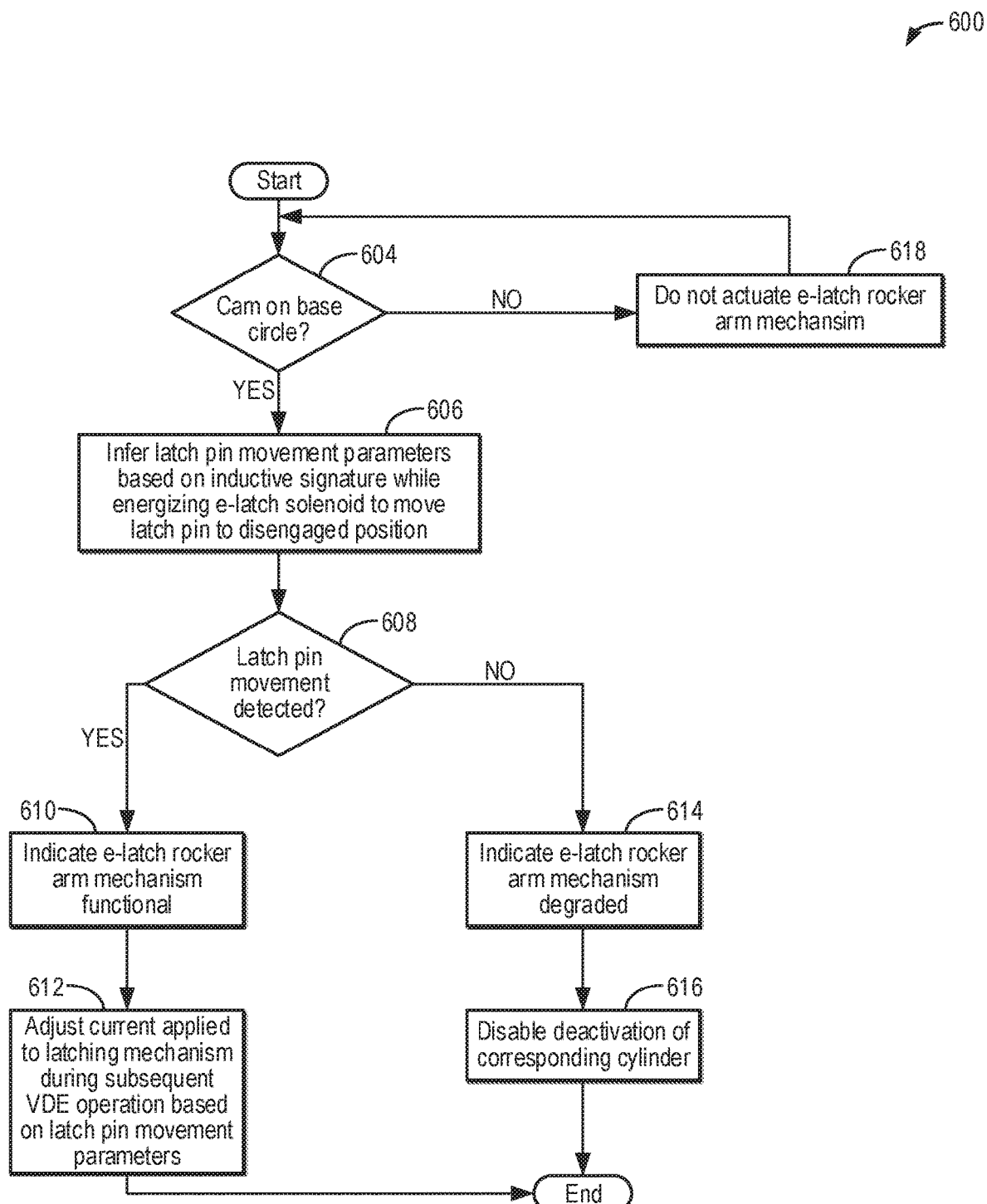
FIGS. 6A-6B shows a flow chart of an example method for diagnosing an electric latch rocker arm mechanism when a change in an operational state of a corresponding valve is commanded.
Figure 6B:
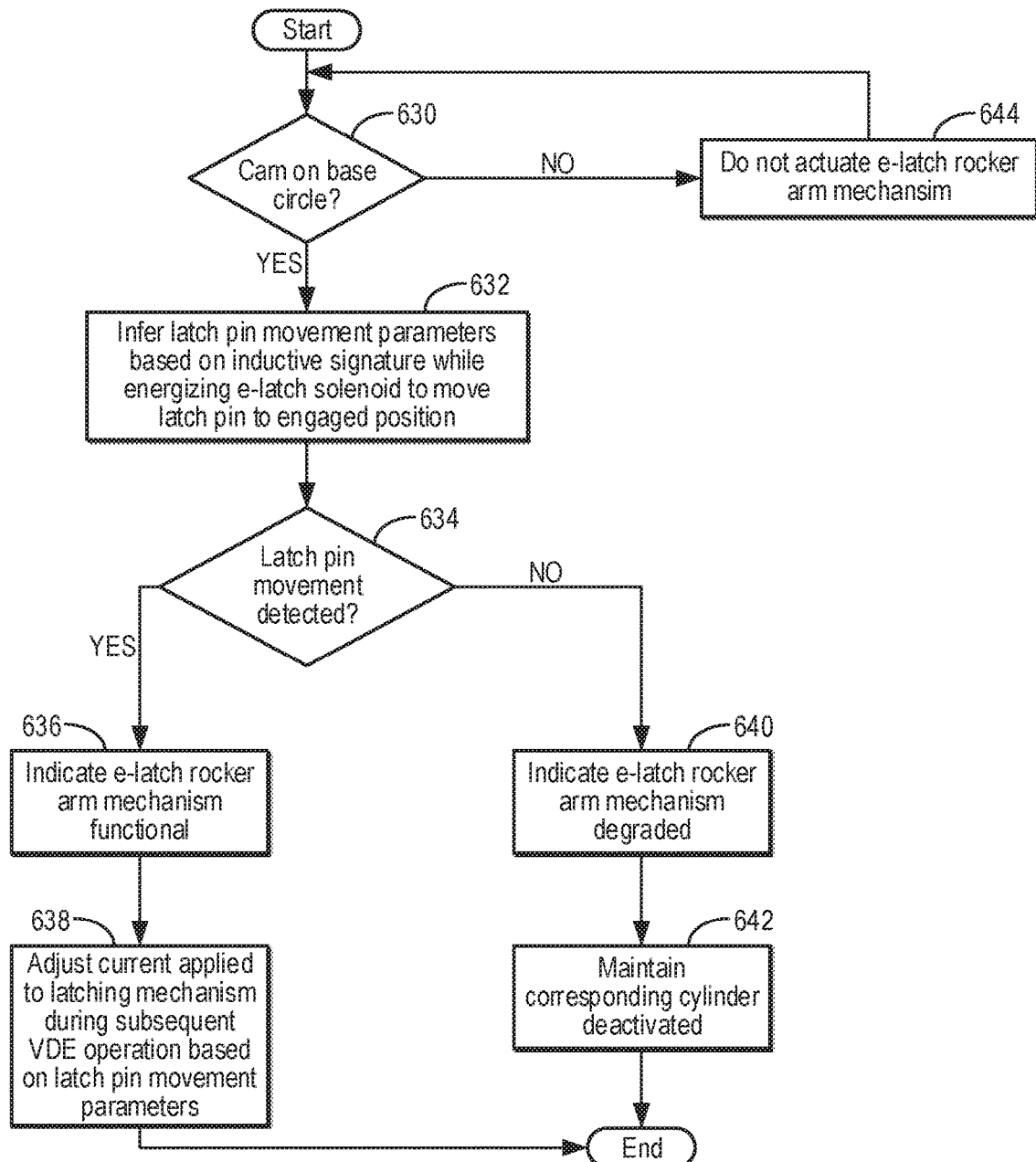

Turning now to FIGS. 6A and 6B, an example method 600 is depicted for diagnosing cylinder valve deactivation mechanisms while entering and exiting a cylinder deactivation mode over the course of a drive cycle. The method is non-intrusive and does not require a VDE mode to be enforced. Instead, the method leverages the inherent transition of the engine into and out of the VDE mode over the course of a drive cycle via an e-latch rocker arm mechanism (e.g., e-latch rocker arm mechanism 202 of FIGS. 2A-2D). The method of FIG. 6A may be performed as a part of the method of FIG. 5, such as at 516, when a VDE mode is entered. Thus, all the steps of FIG. 6A are performed after cylinder valve deactivation has been commanded. Likewise, the method of FIG. 6B may be performed as a part of the method of FIG. 5, such as at 530, when a non-VDE mode is entered. Thus, all the steps of FIG. 6B are performed after cylinder valve reactivation has been commanded.

At 604, after cylinder valve deactivation has been commanded for a selected cylinder, it is determined if the cam for the selected cylinder is on the base circle. Herein, the cam may be an intake cam or an exhaust cam of the selected cylinder, the intake cam coupled to the deactivation mechanism of the intake valve and the exhaust cam coupled to the deactivation mechanism of the exhaust valve of the given cylinder. In one example, cam position on the base circle may be inferred based on the output of a camshaft position sensor. In another example, cam position on the base circle may be inferred based on crankshaft position (e.g., as output by a crankshaft position sensor, such as Hall effect sensor 120 of FIG. 1) and cylinder firing order, as further described with respect to FIG. 9. For example, the controller may infer that the intake cam is on the base circle during the compression, exhaust, and power strokes, and that the exhaust cam is on the base circle during the intake, compression, and power strokes. The crankshaft positions at which the intake and exhaust cams move off of base circle may be further based on cam phasing and a lift profile of the corresponding cam. If the cam is not on the base circle, at 618, method 600 includes not actuating the e-latch rocker arm mechanism. That is, the controller may wait until the cam has returned to the base circle to actuate the e-latch rocker arm mechanism, as the valve state may not be transitioned while the cam is off of the base circle (e.g., during cam lift).

If the cam is on the base circle while a VDE mode has been commanded, at 606, the method includes inferring latch pin movement parameters based on an inductive signature generated while energizing the e-latch solenoid to move the latch pin to a disengaged position. For example, latch pin motion may be inferred based on a decrease in the electrical current signature of the solenoid as well as a time corresponding to the decrease (e.g., valley). For example, as the solenoid is energized (with a voltage pulse having a first polarity), the current increases, causing an increase in a magnetic force on the latch pin until the magnetic force is strong enough to pull the latch pin into the disengaged position. The movement of the latch pin causes a brief reduction in the current through the solenoid due to a back EMF, after which the current continues to increase to its maximum level. Such an inductive signature is illustrated with respect to FIG. 12, for example. The controller may log the crank angle when the latch pin movement happens. For example, the controller may log the angle at which the latch pin transitions from the engaged position to the disengaged position. The movement parameters that are inferred may include, for example, a rate of change in the current, as inferred from a slope of the current (e.g., the derivative of the current signal). As another example, the inferred parameters include a time taken for the latch pin to move from an initial, engaged position to the final, disengaged position. As another example, the inferred parameters may include a velocity of the latch pin when it hits the end stop, as inferred based on a magnitude of the current decrease (e.g., back EMF is proportional to the velocity latch pin). As still another example, the inferred parameters include a determination of how hard the latching pin hits the end stop when it reaches the disengaged position (that is, a relative force with which it hits the end stop), as inferred based on a magnitude of the current decrease. Still other parameters may be inferred.

At 608, based on the inductive signature generated during the solenoid energization, and further based on the inferred latch pin movement parameters, it may be determined if latch pin movement was detected. As elaborated with reference to the table of FIG. 3, in particular at 302 and 304, when the cam is at the base circle, the latch pin is movable for transitioning from an engaged position to a disengaged position to deactivate a cylinder valve. That is, in response to solenoid energization, latch pin movement is expected. If the inductive signature indicates that latch pin movement was detected, as was expected, then at 610, it may be inferred that the e-latch rocker arm mechanism is functional. At 612, the method includes adjusting a current applied to the e-latch mechanism of the given cylinder during a subsequent transition into a VDE mode (e.g., when valve deactivation is subsequently commanded for the given cylinder) based on the inferred latch pin movement parameters. As an example, the engine controller may adjust a magnitude of the current applied to energize the solenoid during a subsequent valve deactivation operation based on the inferred time taken for the latch pin to move to the disengaged position as well as how hard it hit the end stop. For example, the controller may reduce the current applied to the solenoid to reduce the force with which the latch pin hits the end stop when entering the disengaged position, thereby reducing pin wear and extending component life. As another example, the controller may use the time taken for the latch pin to transition from the engaged position to the disengaged position to measure part-to-part variability, such as the solenoid mechanical construction that has variability in the actual flux path in the magnetic circuit. As still another example, the controller may use the final maximum current through the solenoid coil to determine the part-to-part variability of the solenoid resistance. Further still, the controller may increase or decrease the engine speed range wherein switching is enabled. For example, a degraded connection to the solenoid (e.g., high resistance) would slow down the actuator response. If the controller detects that one or more latch pins are moving more slowly than expected, the controller may reduce the maximum speed that VDE can be utilized since a slow moving latch pin may not be able to complete its stroke during the shorter base circle event at higher engine speeds. As yet another example, the controller may use the inferred parameters to confirm camshaft dynamics, as elaborated at FIGS. 9 and 10. Following 612, method 600 ends.

Returning to 608, if the inductive signature indicates that latch pin movement was not detected, then at 614, it may be indicated that the e-latch rocker arm mechanism is degraded. In particular, it may be inferred that the latch pin did not move if the brief reduction in the solenoid current is not observed. Indicating degradation of the e-latch rocker arm mechanism may include setting a diagnostic code, illuminating a light, and/or or notifying a vehicle occupant via an information center. At 616, responsive to the indication of degradation, the method includes disabling deactivation of the given cylinder until e-latch rocker arm repair or replacement is confirmed. Following 616, method 600 ends.

Turning now to FIG. 6B, at 630, after cylinder valve reactivation has been commanded for a selected cylinder, it is determined if the cam for the selected cylinder is on the base circle. Herein, the cam may be an intake cam or an exhaust cam of the selected cylinder, the intake cam coupled to the deactivation mechanism of the intake valve, and the exhaust cam coupled to the deactivation mechanism of the exhaust valve of the given cylinder. As elaborated earlier, cam position on the base circle may be inferred based on the output of a cam position sensor or based on measured or sensed cam timing. If the cam is not on the base circle, at 644, method 600 includes not actuating the e-latch rocker arm mechanism. That is, the controller may wait until the cam has returned to the base circle to actuate the e-latch rocker arm mechanism, as the valve state may not be transitioned while the cam is off of the base circle (e.g., during cam lift).

If the cam is on the base circle while a non-VDE mode has been commanded, at 632, the method includes inferring latch pin movement parameters based on an inductive signature generated while energizing the e-latch solenoid to move the latch pin to the engaged position. As described above at 606 of FIG. 6A, the movement of the latch pin causes a brief reduction in the current through the solenoid, after which the current continues to increase to its maximum level. Therefore, the movement of the latch pin from the disengaged to the engaged position can be inferred from the brief reduction in solenoid current. The controller may log the crank angle when the latch pin movement happens. For example, the controller may log the angle at which the pin transitions from the disengaged position to the engaged position. The movement parameters that are inferred may include, for example, a rate of change in the current, as inferred from a slope of the curve in the inductive signature. As another example, the inferred parameters include a time taken for the latch pin to move from an initial position to the engaged position, as inferred based on the time taken to move from the disengaged position to the engaged position. As another example, the inferred parameters may include a velocity of the latch pin when it hits the end stop, as inferred based on a magnitude of the current decrease (e.g., back EMF is proportional to the velocity latch pin). As still another example, the inferred parameters include a determination of how hard the latch pin hits the inner arm when it reaches the engaged position (that is, the force with which it hits the hard-stop in the inner arm), as inferred based on the magnitude of the current dip. Still other parameters may be inferred.

At 634, based on the inductive signature generated during the solenoid energization, and further based on the inferred latch pin movement parameters, it may be determined if latch pin movement was detected. As elaborated with reference to the table of FIG. 3, in particular at 302 and 304, when the cam is at the base circle, the latch pin is movable when transitioning from a disengaged position to an engaged position to reactivate a cylinder valve. That is, in response to solenoid energization, latch pin movement is expected. If the inductive signature indicates that latch pin movement was detected, as was expected, then at 636, it may be inferred that the e-latch rocker arm mechanism is functional. At 638, the method includes adjusting a current applied to the latching mechanism of the given cylinder during a subsequent transition into a non-VDE mode (e.g., when valve reactivation is subsequently commanded for the given cylinder) based on the inferred latch pin movement parameters. As an example, the engine controller may adjust a magnitude of the current applied to energize the solenoid during a subsequent valve reactivation operation based on the inferred time taken for the latch pin to move to the engaged position as well as how hard it hit. For example, the controller may reduce the current applied to the e-latch solenoid to reduce the force (or the velocity) with which the latch pin hits a hard-stop of an inner arm of the e-latch rocker arm mechanism when entering the engaged position, thereby reducing pin wear and extending component life. As another example, the controller may use the time taken for the latch pin to transition from the disengaged position to the engaged position to measure part-to-part variability, such as the solenoid mechanical construction that has variability in the actual flux path in the magnetic circuit. As another example, the controller may use the final maximum current through the solenoid coil to determine the part-to-part variability of the solenoid resistance. Further still, the controller may increase or decrease the engine speed range wherein switching is enabled. For example, if the controller detects that one or more latch pins are moving more slowly than expected, the controller may reduce the maximum speed that VDE can be utilized since a slow moving latch pin may not be able to complete its stroke during the shorter base circle event at higher engine speeds. As yet another example, the controller may use the inferred parameters to confirm camshaft dynamics. Following 638, method 600 ends.

Returning to 634, if the inductive signature indicates that latch pin movement was not detected, then at 640, it may be indicated that the e-latch rocker arm mechanism is degraded. In particular, it may be inferred that the latch pin is stuck in the disengaged position. Indicating degradation of the e-latch rocker arm may include setting a diagnostic code, illuminating a light, and/or or notifying a vehicle occupant via the information center. At 642, responsive to the indication of degradation, the method includes maintaining the corresponding cylinder deactivated until e-latch rocker arm repair or replacement is confirmed. As an example, if it is determined that the exhaust valve deactivation mechanism is degraded and the latch pin is stuck in the disengaged position, the controller may maintain the intake valve deactivated, even if it is not degraded, while the exhaust valve is stuck in the deactivated position and adjust engine operation accordingly. For example, the average load of all remaining active cylinders may be increased to compensate for the given cylinder being maintained deactivated. Following 642, method 600 ends.

In this way, by correlating cylinder valve deactivation with latch pin movement, VDE diagnostics can be completed while also establishing a cam timing where the movement occurred.

Figure 7:
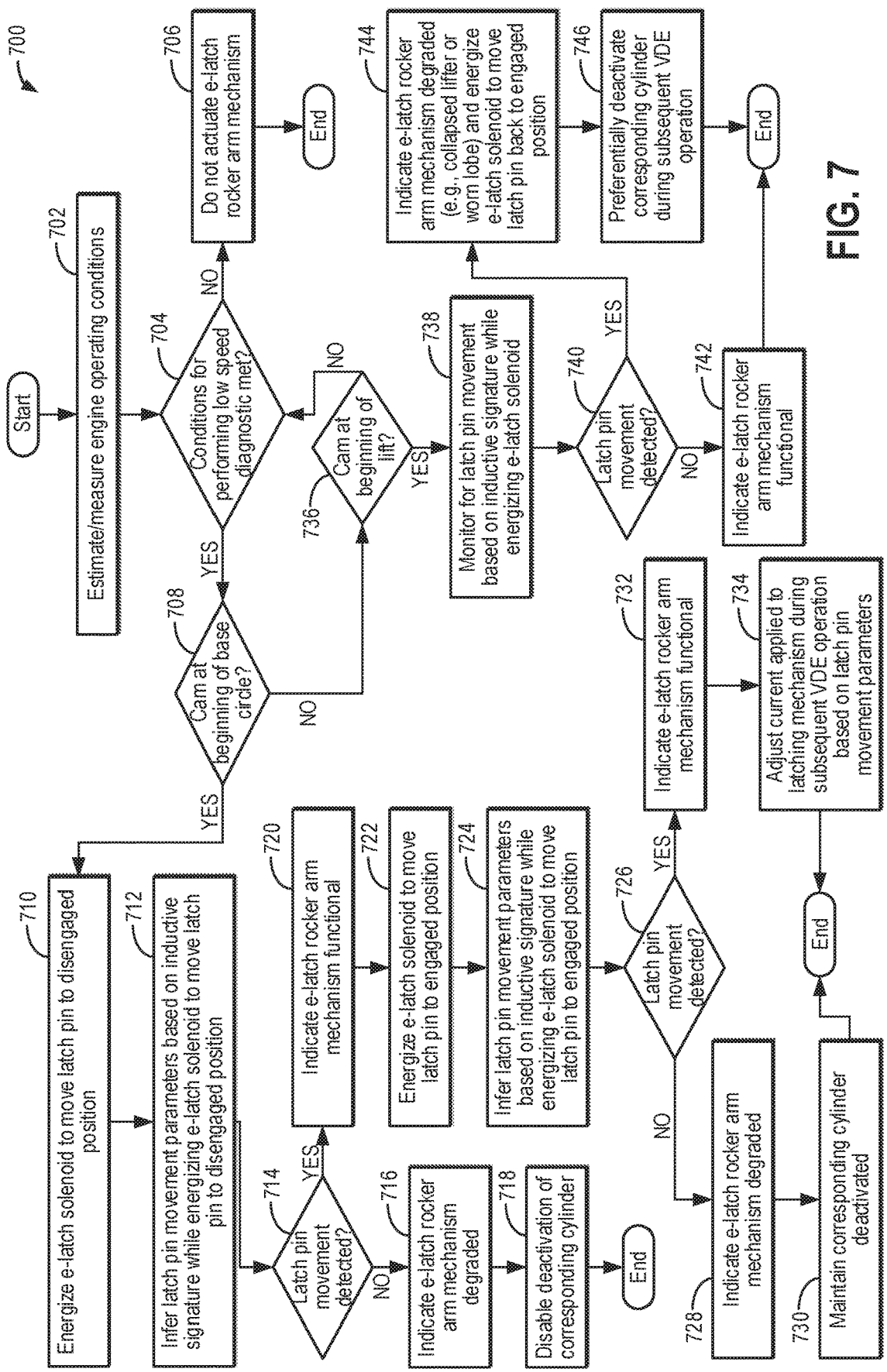
FIG. 7 shows a flow chart of an example method for diagnosing an electric latch rocker arm mechanism during low speed conditions when a change in an operational state of a corresponding valve is not commanded.

Turning now to FIG. 7, an example method 700 is depicted for diagnosing an e-latch rocker arm mechanism, which serves as a cylinder valve deactivation mechanism, opportunistically during low speed conditions when cylinder deactivation is otherwise not required. At low engine speeds, there is time to move a latch pin of the e-latch rocker arm mechanism (e.g., latch pin 214 of FIGS. 2A-2D) from a first position, to a second position, and back to the first position to confirm the operation of the e-latch rocker arm mechanism, independent of a desired valve operating state (e.g., activated or deactivated). Unlike the method of FIGS. 6A-6B, method 700 does not require a transition to a VDE mode of operation. However, a large portion of the steps of method 700 may overlap with the method of FIGS. 6A-6B.

At 702, the method includes estimating and/or measuring engine operating conditions. These may include, for example, engine speed, engine load, torque demand, engine temperature, exhaust temperature, MAP, MAF, air-fuel ratio, etc. At 704, the method includes confirming if conditions have been met for performing the low speed e-latch rocker arm mechanism (e.g., VDE mechanism) diagnostic. In one example, low speed diagnostic conditions may be considered met if the engine is idling. In another example, the low speed diagnostic conditions may be considered met if the engine is at or below a threshold speed. The threshold speed may be a positive, non-zero speed value that may be at or near a typical idle speed. As a non-limiting example, the threshold speed may be 1000 RPM. In still another example, the low speed diagnostic conditions are met when the engine is a green engine that is being started for the first time since assembly, such as while still at an assembly plant. As such, cylinder valve deactivation is not required at low engine speeds. Thus, by selectively enabling the VDE mechanism diagnostic during low speed conditions, the cylinder deactivation mechanism can be diagnosed before it is needed at higher engine speed-load conditions of the same drive cycle. Specifically, the e-latch rocker arm system can be confirmed prior to using the latching mechanism for valve lift control. In addition, the likelihood of completing the VDE mechanism diagnostic on a given drive cycle is increased by taking advantage of the larger amount of time available for enabling or disabling the VDE mechanism. If low speed e-latch rocker arm mechanism diagnostic conditions are not met, at 706, the method includes not actuating the e-latch rocker arm mechanism. For example, an associated solenoid (e.g., solenoid 216 of FIGS. 2A-2D) will not be energized, as moving the latch pin when the low speed diagnostic conditions are not met may result in an inadvertent change in the operating state of the corresponding valve. The method exits and the VDE diagnostic is not conducted at this time.

If the low speed e-latch rocker arm mechanism diagnostic conditions are met, it is determined if the cam is positioned at the beginning of the base circle for the selected cylinder and valve at 708. Herein, the cam may be an intake cam or an exhaust cam of the selected cylinder, the intake cam coupled to the deactivation mechanism of the intake valve and the exhaust cam coupled to the deactivation mechanism of the exhaust valve of the given cylinder. In one example, cam position at the beginning of the base circle may be inferred based on the output of a camshaft position sensor. In another example, cam position at the beginning of the base circle may be inferred based on crankshaft position (e.g., as output by a crankshaft position sensor, such as Hall effect sensor 120 of FIG. 1) and cylinder firing order. For example, the controller may infer that the intake cam is at the beginning of the base circle during the compression stroke, and that the exhaust cam is at the beginning of the base circle during the intake stroke. The crankshaft positions at which the intake and exhaust cams reach the beginning of the base circle may be further based on cam phasing and a lift profile of the corresponding cam. If the cam is not at the beginning of the base circle, at 736 it may be determined if the cam is at the beginning of the lift profile. In one example, the cam may be inferred to be at the beginning of the lift profile based on camshaft position sensor output or cam timing. If the cam is neither at the beginning of the base circle nor at the beginning of the lift profile, the method returns to 704 to continue checking the position of the cam so that the method may execute as long as conditions for performing the low speed diagnostic continue to be met.

If the cam is at the beginning of the base circle, at 710, the method includes energizing the e-latch solenoid to move the latch pin to a disengaged position. In particular, the e-latch solenoid may be energized with a voltage pulse of a first polarity. Then at 712, the method includes inferring latch pin movement parameters based on an inductive signature generated while energizing the e-latch solenoid to move the latch pin to the disengaged position. The controller may log the crank angle when the latching pin movement happens. For example, the controller may log the angle or time at which the latch pin transitions from the engaged position to the disengaged position based on a brief reduction in current through the solenoid, as elaborated above with respect to FIG. 6A. The movement parameters that are inferred may include, for example, a rate of change in the current, as inferred from a slope of the current (or the derivative of the current), a time taken for the latch pin to move from the engaged position to the disengaged position, as inferred based on the time taken for the current to exhibit the brief reduction from a start of a voltage pulse supplied to the solenoid, and a determination of how hard the latch pin hits when it reaches the disengaged position (that is, the force with which it hits the end stop), as inferred based on the timing and magnitude of the current decrease. Still other parameters may be inferred, such as the velocity of the latch pin when it hits the end stop. As an example, the diagnostic may include applying a voltage or duty cycle lower than a normal level for deactivating the rocker arm to test whether the latch pin is able to move even in the presence of a lower actuating force. Successful switching with lower actuating voltage implies a higher likelihood of successful switching with the normal actuating voltage even in the presence of other noise factors, such as increased coil resistance due to heating and increase pin friction due to different oil conditions.

At 714, based on the inductive signature generated during the solenoid energization, and further based on the inferred latch pin movement parameters, it may be determined if latch pin movement was detected. As elaborated with reference to the table of FIG. 3, when the cam is at the base circle, the latch pin is movable when transitioning from the engaged position to the disengaged position to deactivate a cylinder valve. That is, in response to solenoid energization, latch pin movement is expected. If the inductive signature indicates that latch pin movement was not detected, then at 716, it may be indicated that the e-latch rocker arm mechanism is degraded. In particular, it may be inferred that the latch pin did not move from the engaged position to the disengaged position and is stuck in the engaged position. Indicating degradation of the e-latch rocker arm may include setting a diagnostic code, illuminating a light, and/or or notifying a vehicle occupant via an information center.

Additionally or alternatively, prior to indicating degradation, the controller may first confirm that the latch pin was not already in the disengaged position when the unlatching was commanded, which would lead to an absence of latch pin movement. To confirm that the latch pin was not already in the disengaged position, the controller may re-energize the solenoid with a voltage pulse of a second polarity, which is opposite of the first polarity, and monitor for latch pin movement. As described with respect to FIGS. 2A-2D, the voltage pulse of the second polarity actuates the latch pin from the disengaged position to the engaged position. Therefore, if latch pin movement is detected in response to the voltage pulse of the second polarity, it may be inferred that the latch pin is now known to be in the engaged position, degradation may not be indicated, and the diagnostic routine may be repeated to verify full latch pin function. Conversely, if latch pin movement is not detected in response to the voltage pulse of the second polarity, e-latch rocker arm mechanism degradation may be confirmed.

At 718, responsive to the indication of degradation, the method includes disabling deactivation of the given cylinder until e-latch rocker arm repair or replacement is confirmed. That is, the degraded cylinder is maintained active since the latch pin is stuck in the engaged position. The method then ends.

If the inductive signature indicates that latch pin movement was detected at 714, as was expected, then at 720, it may be inferred that the e-latch rocker arm mechanism is functional. Next, the method moves to 722 and includes energizing the e-latch solenoid to move the latch pin to the engaged position. For example, since a change in valve operating state is not desired (e.g., operation in the VDE mode is not desired), the latch pin may be quickly moved back to the engaged position before the cam moves off of the base circle. Then at 724, the method includes inferring latch pin movement parameters based on an inductive signature generated while energizing the e-latch solenoid to move the latch pin to the engaged position.

At 726, as at 714, based on the inductive signature generated during the solenoid energization, and further based on the inferred latch pin movement parameters, it may be determined if latch pin movement was detected. As elaborated with reference to the table of FIG. 3, when the cam is at the base circle, the latch pin is movable when transitioning from the disengaged position to the engaged position to reactivate the cylinder valve. That is, in response to solenoid energization, latch pin movement is expected. If the inductive signature indicates that latch pin movement was not detected, then at 728, it may be indicated that the e-latch rocker arm mechanism is degraded. In particular, it may be inferred that the latch pin did not move from the disengaged position to the engaged position and is stuck in the disengaged position Indicating degradation of the e-latch rocker arm may include setting a diagnostic code, illuminating a light, and/or or notifying a vehicle occupant via the information center. At 730, responsive to the indication of degradation, the method includes maintaining the corresponding cylinder deactivated until the e-latch rocker arm mechanism is repaired, replaced, or otherwise indicated to be functional. For example, if the exhaust valve deactivation mechanism is determined to be degraded and stuck in the disengaged position, maintaining the exhaust valve in the deactivated state, the intake valve may be transitioned to the deactivated state, even if the intake valve deactivation mechanism is functional, to maintain the cylinder deactivated. The method then ends.

In some examples, the controller may additionally periodically attempt to latch the rocker arm mechanism by energizing the corresponding solenoid with a voltage pulse of the second polarity and monitoring for latch pin movement. For example, latching may be attempted once per drive cycle or once per a duration of engine operation (such as once per every 3 hours of engine operation, as one non-limiting example). If latch pin movement is detected due to the latch pin moving to the engaged position, the cylinder may be maintained in the active state until the e-latch rocker arm mechanism is repaired.

If the inductive signature indicates that latch pin movement was detected, as was expected, then at 732, it may be inferred that the e-latch rocker arm mechanism is functional. Next, at 734, the method includes adjusting a current applied to the e-latch mechanism of the given cylinder during a subsequent transition into a VDE mode (e.g., when valve deactivation is subsequently commanded for the given cylinder) based on inferred latch pin movement parameters. As an example, the engine controller may adjust a magnitude of the current applied to energize the solenoid during a subsequent valve deactivation operation based on the inferred time taken for the latch pin to move to the disengaged position, as well as based on how hard it hit. For example, the controller may reduce the current applied to energize the solenoid so as to reduce the force with which the latch pin hits the end stop when entering the disengaged or engaged position, thereby reducing pin wear and extending component life. Following 734, method 700 ends.

In this way, the controller may disable and then re-enable the rocker arm mechanism all while the cam is on the base circle, causing no change in the valve lift. In doing so, the controller can measure the activation time, and from that learn the solenoid response time, as well as confirm that the e-latch rocker arm mechanism is functional without disrupting engine operation.

Returning to 736, if the cam is at the beginning of the lift profile at 738, the method includes monitoring for latch pin movement based on an inductive signature generated while energizing the e-latch solenoid. At 740, based on the inductive signature generated during the solenoid energization, it may be determined if latch pin movement was detected. As elaborated with reference to the table of FIG. 3, when the cam is on the lift profile, the latch pin is not movable for transitioning from an engaged position to a disengaged position to deactivate a cylinder valve. That is, in response to solenoid energization, latch pin movement is not expected. If the inductive signature indicates that latch pin movement was not detected (e.g., no decrease occurs during the current rise during solenoid energization), then at 742, it may be inferred that the e-latch rocker arm mechanism is functional. Herein, the controller may confirm that the latch pin is holding while the cam is at the maximum lift position. The method then ends.

If the inductive signature indicates that latch pin movement was detected, then at 744, it may be indicated that the e-latch rocker arm mechanism is degraded. In particular, it may be inferred that the cam lobe is worn or that there is a collapsed lifter. Indicating degradation may include setting a diagnostic code, illuminating a light, and/or or notifying a vehicle occupant via an information center. Also at 744, the method includes, responsive to the indication of degradation, energizing the e-latch solenoid to move the latch pin back to the engaged position. At 746, also responsive to the indication of degradation, the method includes preferentially deactivating the corresponding cylinder during subsequent VDE operation. For example, the corresponding cylinder may exhibit a higher than average incidence of misfire due to the collapse lifter or worn cam lobe. By preferentially deactivating the corresponding cylinder, an overall occurrence of misfire during the subsequent VDE operation may be reduced. As another example, the controller may choose to operate the engine smoothly but with the given cylinder deactivated over operating the engine roughly (e.g., with more NVH) with all of the cylinders active. In still further examples, the controller may compare a fuel economy and/or NVH of operating the engine with all cylinders active to operating the engine with the given cylinder deactivated and select the state that provides the highest fuel economy and/or lowest NVH. The method then ends.

In this way, the controller may actively and opportunistically induce latch pin movement when transition to and from a VDE state is not commanded and then correlate VDE mechanism functionality with latch pin movement. In particular, the controller can detect latch pin movement while the cam is on the base circle and when the state of the rocker arm does not matter. The controller may energize the solenoid to move the latch pin to the disengaged position (to move the valve to a deactivated state) and then again energize the solenoid to move the latch pin back to the engaged position (to move the valve to an active state), and use the detected opening and closing times for diagnosing the e-latch mechanism and learning solenoid response times. Likewise, the controller can detect latch pin movement (or a lack thereof) while the cam is on lift, wherein the solenoid is energized to attempt to move the latch pin to the disengaged position. The controller may correlate the detection of no movement to confirm that the latch pin stays latched due to the e-latch mechanism being functional. Should latch pin movement occur, indicating degradation of the e-latch rocker arm mechanism, the solenoid may then again be energized to move the latch pin back to the engaged position (to move the valve to an active state).

Figure 8:
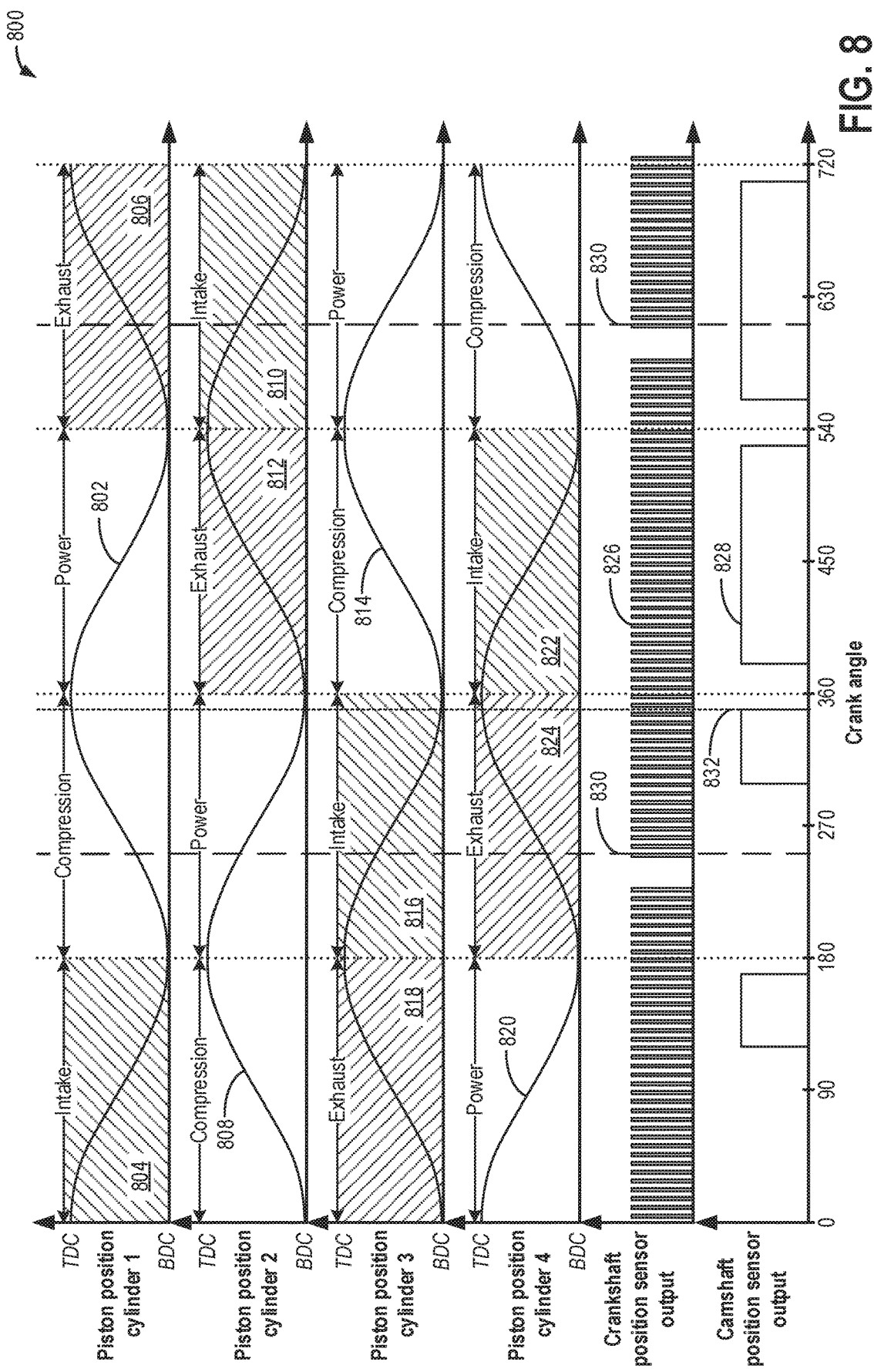
FIG. 8 illustrates an example graph of engine signals generated while a crankshaft is rotated.

Next, FIG. 8 shows an example graph 800 of crankshaft position sensor output and camshaft position sensor output relative to a piston position and stroke of each cylinder of a four-cylinder engine. A piston position of cylinder 1 is shown in plot 802, a piston position of cylinder 2 is shown in plot 808, a piston position of cylinder 3 is shown in plot 814, a piston position of cylinder 4 is shown in plot 820, crankshaft position sensor output is shown in plot 826, and camshaft position sensor output is shown in plot 828. For all of the above plots, the horizontal axis represents crank angle (e.g., in degrees of the crankshaft), with crank angle increasing along the horizontal axis from left to right. In the example of graph 800, 0 crank angle degrees is defined as TDC of the intake stroke of cylinder 1, and the engine has a firing order of 1-3-4-2. The vertical axis represents each labeled parameter, with a value of the labeled parameter increasing along the vertical axis from bottom to top. Furthermore, a timing region wherein an intake valve e-latch rocker arm mechanism latch pin of cylinder 1 is immovable is shown by shaded region 804, a timing region wherein an exhaust valve e-latch rocker arm mechanism latch pin of cylinder 1 is immovable is shown by shaded region 806, a timing region wherein an intake valve e-latch rocker arm mechanism latch pin of cylinder 2 is immovable is shown by shaded region 810, a timing region wherein an exhaust valve e-latch rocker arm mechanism latch pin of cylinder 2 is immovable is shown by shaded region 812, a timing region wherein an intake valve e-latch rocker arm mechanism latch pin of cylinder 3 is immovable is shown by shaded region 816, a timing region wherein an exhaust valve e-latch rocker arm mechanism latch pin of cylinder 3 is immovable is shown by shaded region 818, a timing region wherein an intake valve e-latch rocker arm mechanism latch pin of cylinder 4 is immovable is shown by shaded region 822, and a timing region wherein an exhaust valve e-latch rocker arm mechanism latch pin of cylinder 4 is immovable is shown by shaded region 824. A crankshaft reference edge is indicated by a long-dashed line 830, and a camshaft reference edge is indicated by a short-dashed line 832.

Each of the four cylinders completes all four strokes (e.g., intake, compression, power, and exhaust) once every 720 crank angle degrees, or once every two full rotations of the crankshaft. A crankshaft position sensor (e.g., Hall effect sensor 120 of FIG. 1) is configured to sense the presence or absence of equally spaced teeth on a toothed disc or wheel coupled to the crankshaft (e.g., a pulse-wheel). As the crankshaft rotates, each time a tooth passes the crankshaft position sensor, the voltage output of the sensor switches from near zero voltage (off) to maximum voltage (on) in a square wave, as shown in plot 826. A gap in the teeth placed at a known crankshaft position, resulting in a gap in the square wave, serves as a position reference for the crankshaft position sensor. For example, between 0 and 180 crank angle degrees, the crankshaft position sensor output (plot 826) shows the square wave. Between 180 and 270 crank angle degrees (e.g., at around 230 crank angle degrees), the gap in the square wave occurs due to the missing teeth of the crankshaft pulse-wheel. The return of the square wave after the gap (e.g., at around 250 crank angle degrees) creates the crankshaft reference edge 830. As an example, such as illustrated in FIG. 8, the gap may have a window of 20 crank angle degrees. As another example, the gap may have a window of 12 crank angle degrees. The controller may use a combination of the presence, absence, and return of the square wave to identify the crankshaft reference edge 830. For example, the absence of the square wave alone or the absence and then presence of the square wave may not reliably denote the crankshaft reference edge 830. Therefore, depending on a starting position of the crankshaft, it may take a variable duration (or crankshaft rotation) for the controller to detect the presence, absence, and return of the crankshaft position sensor square wave.

The crankshaft reference edge occurs once every 360 crank angle degrees. For example, as shown in FIG. 8, a second crankshaft reference edge 830 occurs at around 610 crank angle degrees. Therefore, the crankshaft reference edge 830 alone does not reveal the stroke of each cylinder. For example, cylinder 1 may be in a compression stroke or an exhaust stroke when the crankshaft reference edge 830 is identified.

An intake camshaft and an exhaust camshaft each rotate once per 720 crank angle degrees (e.g., once per four-stroke engine cycle). Each of the intake camshaft and the exhaust camshaft may have a toothed disc or wheel (e.g., a pulse-wheel) coupled thereto, the rotation of which may be sensed by a corresponding camshaft position sensor (e.g., camshaft position sensors 155 and 157 shown in FIG. 1). Particularly, the camshaft pulse-wheel may include variably sized teeth that are unequally spaced such that some teeth are positioned closer to one another while other teeth are positioned farther away from one another. Unequal pulse durations and spacing among the pulses in a resulting pulsetrain, shown in plot 828, creates the camshaft reference edge 832, which occurs once per 720 crank angle degrees. The camshaft reference edge 832 may correspond to a particular orientation the crankshaft and piston stroke, such as near TDC of the compression stroke of cylinder 1. Similar to determining the crankshaft position, the controller may use signal data from before and after the camshaft reference edge in order to conclusively identify the camshaft reference edge and determine the camshaft position therefrom. Furthermore, a falling edge of each cam pulse-wheel tooth may be equally spaced throughout 720 crank angle degrees while the rising edges may be spaced in a defined pattern that the controller may identify and synchronize with crank position signals. In an alternative example, the rising edges may be equally spaced while the falling edges are spaced in the defined pattern.

The output of only one camshaft position sensor (which could be either the exhaust camshaft position sensor or the intake camshaft position sensor) is shown in FIG. 8 (plot 828), as the pulsetrain output by the exhaust camshaft position sensor has the same timing as the pulsetrain output by the intake camshaft position sensor in this example. However, in other examples, such as when variable cam timing is used, the output of the exhaust camshaft position sensor may be shifted relative to the output of the intake camshaft position sensor.

Unlike the crankshaft reference edge 830, which occurs at a defined position once per 360 crank angle degrees, and the camshaft reference edge 832, which occurs at a defined position once per 720 crank angle degrees, an inductive signature of an e-latch solenoid of each intake valve and an inductive signature of an e-latch solenoid of each exhaust valve provide piston stroke information throughout the 360 degree crankshaft rotation and the 720 camshaft rotation. For example, at any given crankshaft position and camshaft position, one cylinder is in an intake stroke, during which the intake valve latch pin is immovable, and one cylinder is in an exhaust stroke, during which the exhaust valve latch pin is immovable. As summarized with respect to table 300 of FIG. 3, when a corresponding cam is positioned on its lobe, the latch pin is not movable regardless of an activation state of the valve. Therefore, if an intake valve e-latch solenoid is energized and the corresponding latch pin does not move, as determined from an inductive signature of the solenoid, it may be inferred that the corresponding cylinder is in its intake stroke. Similarly, if an exhaust valve e-latch solenoid is energized and the corresponding latch pin does not move, it may be inferred that the corresponding cylinder is in is exhaust stroke. For example, if the intake valve e-latch solenoid of each cylinder is energized at 90 crank angle degrees, the latch pin of the intake valve of cylinder 1 will not move (shaded region 804) while the latch pins of the intake valves of cylinders 2, 3, and 4 will move. As another example, if the exhaust valve e-latch solenoid of each cylinder is energized at 400 crank angle degrees, the latch pin corresponding to the exhaust valve of cylinder 2 will not move (shaded region 812) while the latch pins of the exhaust valves of cylinders 1, 3, and 4 will move. Note that the shaded timing regions shown in FIG. 8 are exemplary in nature and in other examples, the timing and duration may vary.

Figure 9:
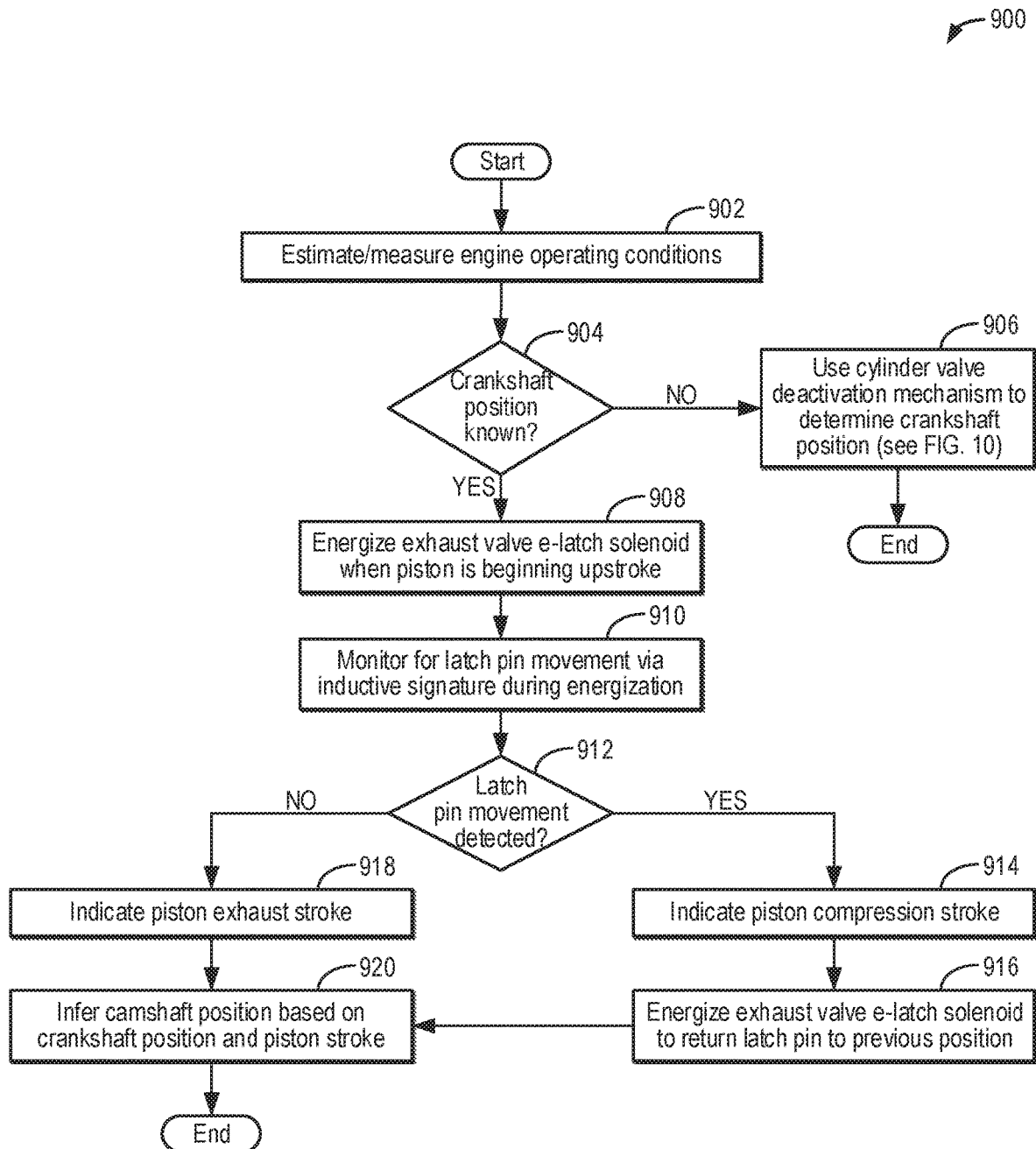
FIG. 9 shows a flow chart of an example method for determining camshaft position via an electric latch rocker arm mechanism when a crankshaft position is known.

Turning now to FIG. 9, an example method 900 is shown for using an e-latch rocker arm mechanism (e.g., e-latch rocker arm mechanism 202 of FIGS. 2A-2D) for camshaft position detection in a fixed cam engine. Camshaft position detection via the e-latch mechanism may be used to diagnose an existing camshaft position sensor, replace a camshaft position sensor, or to estimate camshaft timing during conditions when the output of the camshaft position sensor is not available or not reliable. By knowing the camshaft timing, fuel delivery precision can be increased. The method of FIG. 9 enables camshaft position determination when crankshaft position data is available, such as from a crankshaft position sensor. In comparison, the method of FIG. 10 enables camshaft position determination when crankshaft position data is not yet available.

At 902, the method includes estimating and/or measuring engine operating conditions. These may include, for example, engine speed, engine load, torque demand, engine temperature, exhaust temperature, air-fuel ratio, MAP, MAF, ambient conditions such as ambient temperature, pressure, and humidity, etc. At 904, it may be determined if a crankshaft position is known. In one example, a crankshaft position is learned based on an output of a functional crankshaft position sensor (e.g., Hall effect sensor 120 of FIG. 1). During an engine start, it may take a variable amount of time for a controller to determine the crankshaft position from the output of the crankshaft position sensor, with the amount of time varying based on engine speed, ambient temperature, and a starting position of the crankshaft, for example. As one example, if the crankshaft position sensor is receiving pulses that indicate the crankshaft is rotating, but has not yet encountered the gap or reference edge, the controller will not know the position of the crankshaft. As another example, the crankshaft position sensor may not provide a reliable signal due to sensor degradation, such as due to a loose electrical connection to the sensor. If the crankshaft position is not yet known, or if the crankshaft position sensor is degraded, then at 906, the method includes using the cylinder valve deactivation mechanism to determine the crankshaft position. As elaborated at FIG. 10, this includes inferring the crankshaft position based in part on an inductive signature of each intake valve e-latch solenoid, the signature generated upon energizing the solenoid of each engine cylinder's intake valve.

If the crankshaft position is known, at 908, the method includes energizing an e-latch solenoid of an exhaust valve corresponding to a cylinder with its piston near the beginning of its upstroke, just after BDC. The BDC point may be inferred based on the sensed crankshaft position. In a fixed cam engine, the camshaft spins at one-half of the engine speed (e.g., the camshaft rotates once per 720 crankshaft degrees). Using a four-cylinder engine as an example, a first set of two cylinders will have pistons starting an upstroke while a second set of two cylinders will have pistons starting a downstroke at a first engine position (e.g., 180 crank angle degrees), as shown in FIG. 8. Similarly, the pistons of the first set of two cylinders will be starting a downstroke while the pistons of the second set of two cylinders will be starting an upstroke at a second engine position that is 180 crank angle degrees later (e.g., at 360 crank angle degrees). Of the two cylinders in the upstroke at the given crankshaft position, one cylinder is in the exhaust stroke while the other is in the compression stroke, but the crankshaft position alone does not distinguish between the two.

The e-latch solenoid corresponding to the exhaust valve of a cylinder having its piston in an upstroke may be energized with a voltage pulse to attempt to move a latch pin of the e-latch rocker arm mechanism. As described with respect to FIGS. 2A-2D and summarized in the table of FIG. 3, the latch pin may move between an engaged and a disengaged position when a corresponding cam is on a base circle but not when the cam is on a lobe. During the compression stroke, the exhaust valve cam is on the base circle and is therefore movable, but during the exhaust stroke, the exhaust valve cam is on the lobe and is therefore immovable. Therefore, assuming the current position of the latch pin is known, the controller may energize the exhaust valve e-latch solenoid with voltage of an appropriate polarity for eliciting movement. For example, if the latch pin is in the engaged position, the e-latch solenoid may be energized with voltage of a first polarity to attempt to move the latch pin to the disengaged position. In another example, if the latch pin is in the disengaged position, the e-latch solenoid may be energized with voltage of a second polarity, opposite of the first polarity, to attempt to move the latch pin to the engaged position. If the current position of the latch pin is unknown, then the latch pin position may be reset prior to performing method 900, such as according to the method of FIG. 4.

At 910, the method includes monitoring for latch pin movement via an inductive signature of the e-latch solenoid during the energization. The inductive signature refers to a measured current through the e-latch solenoid during the energization. If the cam is on the base circle and the associated latch pin moves, the movement causes the current to momentarily decrease (e.g., a slope of the current changes), which appears as a valley in the solenoid current during the energization, as illustrated with respect to FIG. 14. In contrast, when the cam is on the lobe and the associated latch pin does not move, the solenoid current will steadily increase without a valley until a maximum current is reached.

At 912, it may be determined whether latch pin movement was detected based on the generated inductive signature. In one example, latch pin movement may be confirmed if the inductive signature includes a valley in the measured solenoid current and/or a change in the slope of the solenoid current, and a lack of latch pin movement may be confirmed if the inductive signature includes a steady increase (e.g., without a decrease) until the maximum current is reached.

If latch pin movement is confirmed, then at 914, the method includes indicating that the piston of the given cylinder is in a compression stroke. At 916, upon indicating that the piston is in the compression stroke, the method includes energizing the exhaust valve e-latch solenoid to return the latch pin of the given cylinder to the previous position. For example, if the exhaust valve latch pin started in the engaged position, then it may be returned to the engaged position via energizing the associated solenoid with a voltage pulse of the second polarity. In another example, if the exhaust valve latch pin started in the disengaged position, then it may be returned to the disengaged position via energizing the associated solenoid with a voltage pulse of the first polarity. In this way, an inadvertent valve change of state (e.g., from active to deactivated or from deactivated to active) may be avoided.

Returning to 912, if latch pin movement is not confirmed, then at 918, the method includes indicating that the piston of the given cylinder is in an exhaust stroke. From each of 916 and 918, the method moves to 920 and includes inferring the camshaft position based on the crankshaft position (sensed from the crankshaft position sensor) and the indicated piston stroke. As one example, referencing FIG. 8, if the crankshaft is sensed to be at the reference edge 830, then it could be at either 250 degrees or 610 degrees. If the solenoid for an exhaust valve on cylinder 1 was energized and it was detected that the latch pin had moved, then it may be determined that cylinder 1 was on the compression stroke and therefore, the crankshaft is at angle 250 and not angle 610. As another example, if the latch pin of the exhaust valve on cylinder 1 did not move in response to the energization, it may be determined that cylinder 1 was on the exhaust stroke and therefore, the crankshaft is at angle 610 and not angle 250.

Although the controller may determine the piston stroke (and then the camshaft position from the crankshaft position and the piston stroke) from energizing the exhaust valve e-latch solenoid corresponding to one cylinder, in other examples, the exhaust valve e-latch solenoids of more than one cylinder may be energized, such as two cylinders with pistons in their upstrokes, or every cylinder. In such an example, the lack of movement of the exhaust valve latch pin determines the piston stroke (e.g., the exhaust stroke).

In an alternative example, an intake valve e-latch solenoid may be energized in an analogous fashion while the piston is in a downstroke. For example, with the piston starting a downstroke, the given cylinder is either in an intake stroke, during which a corresponding intake cam is on the lobe and the latch pin is immovable, or a power stroke, during which the corresponding intake cam is on the base circle or the latch pin is movable. Based on whether or not the inductive signature of the intake valve e-latch solenoid indicates latch pin movement, the controller may distinguish between the power stroke (e.g., latch pin movement is confirmed) and the intake stroke (e.g., a lack of latch pin movement is confirmed). In some examples, the controller may preferentially determine the camshaft timing using the exhaust valve deactivation mechanism over the intake valve deactivation mechanism (and vice versa) based on desired valve states during start up, operating conditions, etc.

In this way, camshaft timing may be accurately detected without needing to rely on a camshaft sensor, although such a sensor may be used in addition. Further, by not relying on misfire detection or crankshaft acceleration data for determining a camshaft timing, exhaust emissions can be improved.

Figure 10:
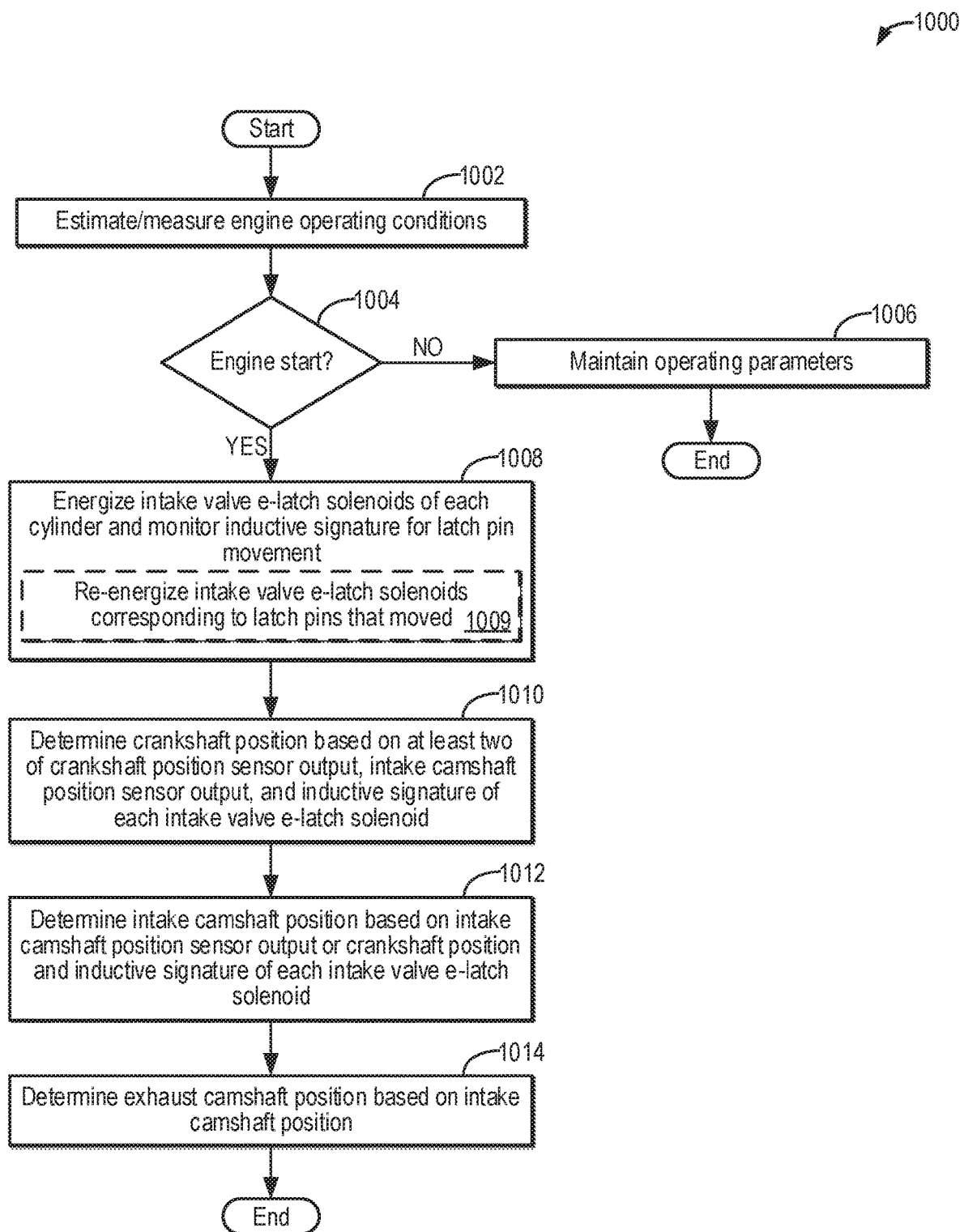
FIG. 10 shows a flow chart of an example method for determining crankshaft and camshaft position via an electric latch rocker arm mechanism.

Turning now to FIG. 10, an example method 1000 is shown for using the e-latch mechanism for camshaft and crankshaft position detection. By knowing the camshaft timing, fuel delivery precision can be improved. The method of FIG. 10 enables camshaft position determination when crankshaft position data is not available, such as when an engine has been restarted from rest. Method 1000 may be performed as a part of method 900 of FIG. 9 (e.g., at 906).

At 1002, the method includes estimating and/or measuring engine operating conditions. These may include, for example, engine speed, engine load, torque demand, engine temperature, exhaust temperature, air-fuel ratio, ambient conditions such as ambient temperature, pressure, and humidity, etc. Engine operating conditions may further include intake and exhaust valve operational states. A latch pin position (e.g., engaged or disengaged, when the valve is active or deactivated, respectively) of each valve e-latch rocker arm mechanism may be inferred from the intake and exhaust valve operational states. If the current intake valve and exhaust valve operational states are unknown, the controller may reset the corresponding latch pins according to the method of FIG. 4, for example.

At 1004, it may be determined if an engine start condition is present. For example, it may be determined if a key-on event has occurred, if a starter motor has been engaged to crank the engine unfueled, and/or if the engine speed is at or below an engine cranking speed. If an engine start is not confirmed, the method moves to 1006 to maintain operating parameters. At this time, crankshaft position is unavailable and undeterminable, and therefore camshaft position determination is also not possible.

If an engine start is confirmed, then at 1008, the method includes energizing an intake valve e-latch solenoid of each engine cylinder and monitoring the corresponding inductive signature generated upon the energization for latch pin movement. For example, if the intake valve latch pin is in the engaged position, the corresponding solenoid may be energized with a voltage pulse of a first polarity to attempt to move the latch pin to the disengaged position. In another example, if the intake valve latch pin is in the disengaged position, the corresponding solenoid may be energized with a voltage pulse of a second polarity, which is opposite of the first polarity, to attempt to move the latch pin to the engaged position. As described above at 910 of FIG. 9, a decrease in the inductive signature is indicative of latch pin movement. If the intake valve latch pin moves, the corresponding cylinder may be in its exhaust, compression, or power stroke, during which a corresponding intake cam is on base circle and latch pin movement is possible. If the intake valve latch pin does not move, the corresponding cylinder is inferred to be in its intake stroke, during which the corresponding intake cam is on the lobe and latch pin movement does not occur. Using a four-cylinder engine as an example, at any (unknown) crankshaft position, one cylinder is in an intake stroke. Once the intake stroke cylinder is identified, strokes of the remaining cylinders may be inferred based on a known firing order of the engine. At 1009, method 1000 optionally includes re-energizing the intake valve e-latch solenoid corresponding to the latch pins that moved in order to actuate the corresponding latch pins to the previous position. If a change in intake valve state is not desired, returning the latch pins to the previous (e.g., starting) position prevents inadvertently deactivating (when the starting position is the engaged position) or activating (when the starting position is the disengaged position) the corresponding intake valves, for example. If the latch pins started in the engaged position, then the corresponding solenoids may be energized with a voltage pulse of the second polarity to move the latch pin from the disengaged position back to the engaged position. If the latch pins started in the disengaged position, then the corresponding solenoids may be energized with a voltage pulse of the first polarity to move the latch pin from the engaged position back to the disengaged position. In another example, when a change in the intake valve state is desired, 1009 may be omitted.

At 1010, the method includes determining the crankshaft position based on at least two of a crankshaft position sensor output, an intake camshaft position sensor output, and the inductive signature of each intake valve e-latch solenoid. The controller may select the first two signals of the crankshaft position sensor output, the intake camshaft position sensor output, and the inductive signature of each intake valve e-latch solenoid that give usable information for determining the crankshaft position. For example, it may take a variable duration for the controller to identify a characteristic crankshaft reference edge signal (e.g., a "sync-pulse") from the crankshaft position sensor output and a characteristic camshaft reference edge signal from the camshaft position sensor output based on a starting position of the engine, engine speed, and ambient temperature. In contrast, the inductive signature of each e-latch solenoid reveals which cylinder is in the intake stroke at any (unknown) engine position.

Returning briefly to FIG. 8, as an example, if the engine starting position is 450 degrees, the inductive signature of each intake valve e-latch solenoid would identify cylinder 4 as in the intake stroke (shaded region 822). This piston stroke identification may be combined with the next change in signal from the camshaft position sensor to determine the crank angle. For example, moving forward from (unknown) crankshaft angle 450, the next change in camshaft signal occurs at angle 530 where the signal changes from high to low. Combining the information that cylinder 4 was on the intake stroke with the detection of a transition from high to low of the camshaft signal results in the determination that the engine is at angle 530 at that moment. Determining the crankshaft signal to this level of accuracy requires that either the intake camshaft be a fixed camshaft (e.g., not able to be varied or phased relative to the crankshaft), or that the camshaft is known to be in a particular phased position, such as a default locked position, when method 1000 is executed. The pulses from the crankshaft signal can be used to update the angle of the crankshaft and the camshaft from that point forward. As another example, if the engine starting position is 200 degrees, the inductive signature of each intake valve e-latch solenoid would identify cylinder 3 as in the intake stroke (shaded region 816). This piston stroke identification may be combined with the signals from the crankshaft as it turns to identify the next crankshaft reference edge as being angle 250. As still another example, the crankshaft position sensor output may be combined with the camshaft position sensor output when a crankshaft reference edge and camshaft signal state are available prior to the interpretation of an inductive signature from the energization of latch pin solenoids.

Returning to FIG. 10, at 1012, the method includes determining the intake camshaft position for each cylinder based on the inductive signature of each intake valve e-latch solenoid and further based on one of the inferred crankshaft position and the intake camshaft position sensor output. For example, the inferred crankshaft position and the inferred cylinder stroke (e.g., as determined from the inductive signature of each intake valve e-latch solenoid) may be used to determine the rotational orientation of the intake camshaft relative to the crankshaft, particularly when the camshaft position sensor is not included or when the camshaft position sensor output has not yet identified the camshaft position. If the intake camshaft is a fixed camshaft that cannot vary its angular position relative to the crankshaft, then its position can be directly calculated once the crankshaft position is known. In an alternative example, if the intake camshaft is able to be varied using a camshaft phasing mechanism and the camshaft position sensor is included, then the known crankshaft position information can be combined with the signal from the camshaft position sensor to determine the camshaft position, and the inductive signature may not be used to determine the intake camshaft position.

At 1014, the method includes determining the exhaust camshaft position for each cylinder based on the inferred intake camshaft position. For example, the exhaust camshaft position may be at a known offset (e.g., rotated a number of degrees) from the intake camshaft position. The exhaust camshaft position may then be determined from the inferred intake camshaft position and the known offset. In another example, the intake cam and the exhaust cam may be included on a single camshaft. The method then ends.

In an alternative example, the exhaust valve e-latch solenoid of each cylinder may be energized in an analogous fashion during the crankshaft position learning. If the exhaust valve latch pin moves, the corresponding cylinder may be in its intake, compression, or power stroke, during which a corresponding exhaust cam is on base circle and latch pin movement is possible. If the exhaust valve latch pin does not move, the corresponding cylinder is inferred to be in its exhaust stroke, during which the corresponding exhaust cam is on the lobe and latch pin movement does not occur. Using a four-cylinder engine as an example, at any (unknown) crankshaft position, one cylinder is in an exhaust stroke. Once the exhaust stroke cylinder is identified, strokes of the remaining cylinders may be inferred based on a known firing order of the engine. In some examples, the controller may preferentially determine the crankshaft position using the exhaust valve deactivation mechanism over the intake valve deactivation mechanism (and vice versa) based on desired valve states during start up, operating conditions, etc.

In this way, crankshaft and camshaft timing may be accurately detected with or without a camshaft sensor. The e-latch rocker arm mechanism provides an additional signal from which the crankshaft position and/or the camshaft position can be determined, which may enable the crankshaft position and/or the camshaft position to be determined quickly and reliably. Thereby, fuel injection timing and ignition timing may be accurately controlled, and engine start times may be decreased. Further, by not relying on misfire detection or crankshaft acceleration data for determining the camshaft position, exhaust emissions can be improved.

Figure 11:
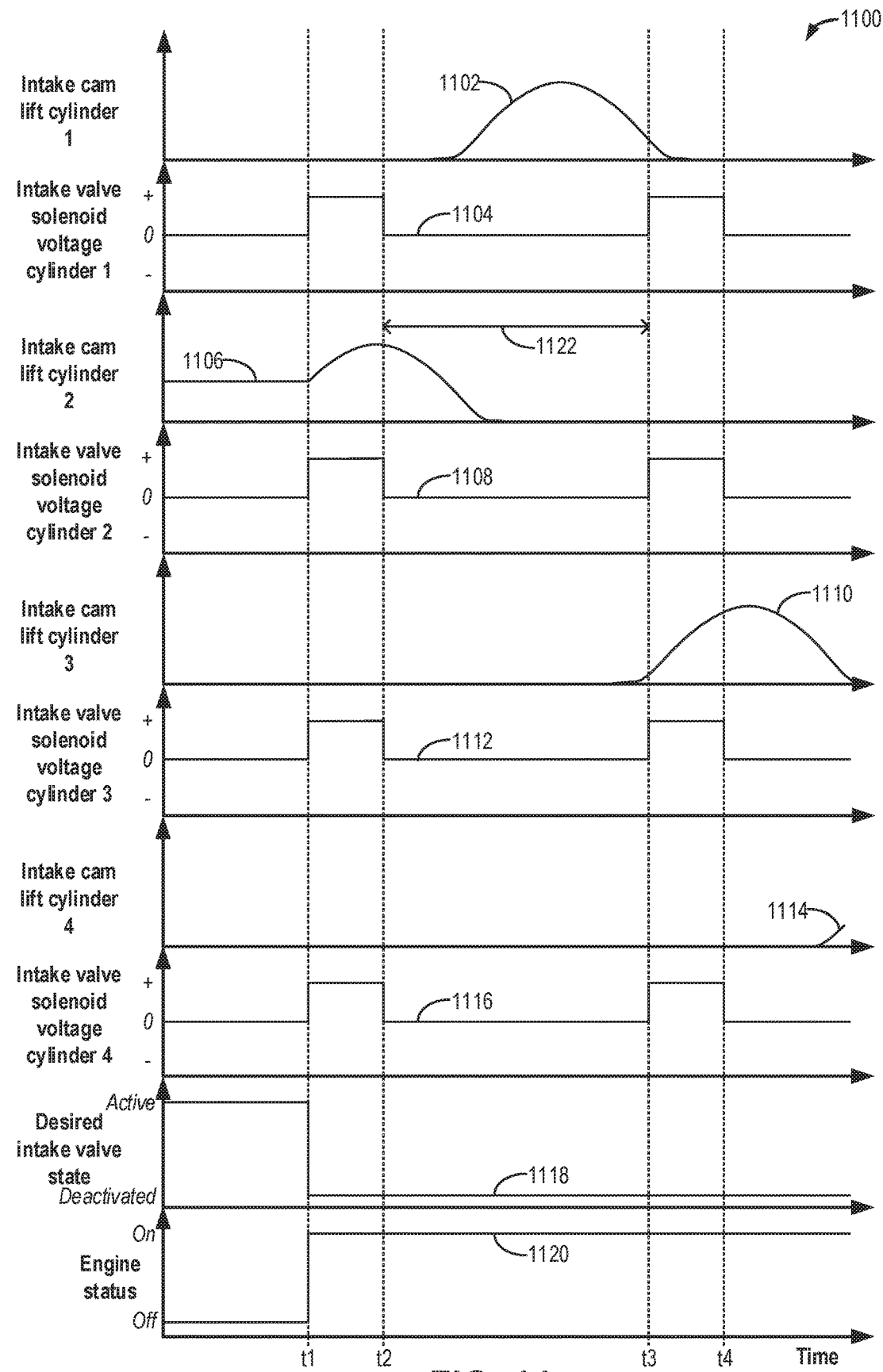
FIG. 11 depicts a prophetic example of setting cylinder intake valves to a desired state during an engine start without camshaft position information.

Next, FIG. 11 shows an example graph 1100 of setting intake valves of a four-cylinder engine to a desired operational state during an engine start. For example, the intake valves may be set to the desired operational state in response to an engine start request and before intake valve camshaft timing is known, such as according to the example method of FIG. 4. Although the example of graph 1100 shows setting the intake valves to the desired operational state, it should be understood that exhaust valves may also be set to a desired operational state during the engine start, which may be different than the desired intake valve operational state in some examples. Furthermore, in some examples, the desired intake valve and/or exhaust valve operational state may not be the same for every cylinder. Intake cam lift of cylinder 1 is shown in plot 1102, intake valve solenoid voltage of cylinder 1 is shown in plot 1104, intake cam lift of cylinder 2 is shown in plot 1106, intake valve solenoid voltage of cylinder 2 is shown in plot 1108, intake cam lift of cylinder 3 is shown in plot 1110, intake valve solenoid voltage of cylinder 3 is shown in plot 1112, intake cam lift of cylinder 4 is shown in plot 1114, intake valve solenoid voltage of cylinder 4 is shown in plot 1116, a desired intake valve state (e.g., for the intake valves of all four cylinders) is shown in plot 1118, and engine status is shown in plot 1120. For all of the above, the horizontal axis represents time, with time increasing along the horizontal axis from left to right. The vertical axis represents each labeled parameter, with the value of the labeled parameter increasing along the vertical axis from bottom to top, with the exceptions of plot 1118, in which the vertical axis represents whether the desired valve state is active or deactivated, as labeled, and plot 1120, in which the vertical axis represents whether the engine is on (e.g., operating at a non-zero speed, with combustion occurring in the engine cylinders) or off (e.g., at rest, without combustion occurring in the cylinders). In plots 1102, 1106, 1110, and 1114, intake cam lift refers to a radius from a base circle of the cam (e.g., on a lobe of the cam, such as lobe 151b of FIGS. 2A-2D), which varies as the cam is rotated against a cam follower during engine operation.

Prior to time t1, the engine is off, as shown in plot 1120. During the prior engine shutdown, the intake valves were kept in the active state (plot 1118), enabling each intake valve to open in response to intake cam lift. For example, a latch pin of each intake valve e-latch rocker arm mechanism is in an engaged position, as illustrated with respect to FIGS. 2A-2D and summarized in the table of FIG. 3. While the engine is off, the intake cam of each cylinder does not rotate. The intake cams of cylinder 1 (plot 1102), cylinder 3 (plot 1110), and cylinder 4 (plot 1114) are on their base circles, as illustrated by zero intake cam lift. Therefore, a corresponding intake valve e-latch rocker arm mechanism is unloaded for each of cylinders 1, 3, and 4, and latch pins of each of the e-latch rocker arm mechanisms are moveable. The intake cam of cylinder 2 (plot 1106) is on its lobe, as illustrated by the non-zero intake cam lift. Therefore, a corresponding intake valve e-latch rocker arm mechanism is loaded, and the latch pin of the intake valve e-latch rocker arm mechanism of cylinder 2 is immovable.

At time t1, an engine start is requested, and the engine status changes to on (plot 1120). In response to the engine start request, intake valve deactivation is desired (plot 1118) in order to reduce an air spring within each cylinder during the engine start. However, an engine controller (e.g., controller 12 of FIG. 1) may no longer know the cam position of each intake valve, such as the lifted position of the intake cam of cylinder 2 (plot 1106), and may no longer know the latch pin position of each intake valve e-latch rocker arm mechanism. Between time t1 and time t2, a solenoid of each intake valve e-latch rocker arm mechanism is energized with a voltage pulse having a first polarity (e.g., positive voltage) in order to attempt to move any latched latch pins into a disengaged position (plots 1104, 1108, 1112, and 1116). Due to the intake cams of cylinders 1, cylinder 3, and cylinder 4 being on the base circle (plots 1102, 1110, and 1114, respectively), the latch pins of the corresponding intake valve e-latch rocker arm mechanisms move from the engaged to the disengaged position that deactivates the valves. If the inductive signature of each solenoid is monitored, the latch pin movement appears as a momentary decrease in the solenoid current, as will be shown in FIG. 12. Due to the intake cam of cylinder 2 being lifted during the energization (e.g., between time t1 and time t2), the intake valve latch pin of cylinder 2 does not move. Therefore, by time t2, the intake valves of cylinders 1, 3, and 4 are deactivated while the intake valve of cylinder 2 remains active, with its latch pin in the engaged position.

At time t3, a threshold rotation indicated by line 1122 is reached. As described with respect to FIG. 4, the threshold rotation corresponds to a maximum valve duration after which any lifted cam will be returned to the base circle. Therefore, the intake valve e-latch solenoid of each cylinder is re-energized with a voltage pulse of the first polarity between time t3 and time 4 (plots 1104, 1108, 1112, and 1116). At time t3, the intake cam of cylinder 2 is no longer lifted (plot 1106), and so the intake valve latch pin of cylinder 2 moves from the engaged to the disengaged position. Because the intake valves of cylinders 1, 3, and 4 are already deactivated, with their corresponding intake valve latch pins in the disengaged position, re-energizing their intake valve e-latch solenoids with the voltage pulse of the first polarity does not further move the corresponding latch pins or alter the valve operational state. Thus, by time t4, all of the intake valves are deactivated. In this way, the engine start is facilitated by deactivating the cylinder intake valves even without knowledge of the cam position of each cylinder or the starting valve state.

Figure 12:
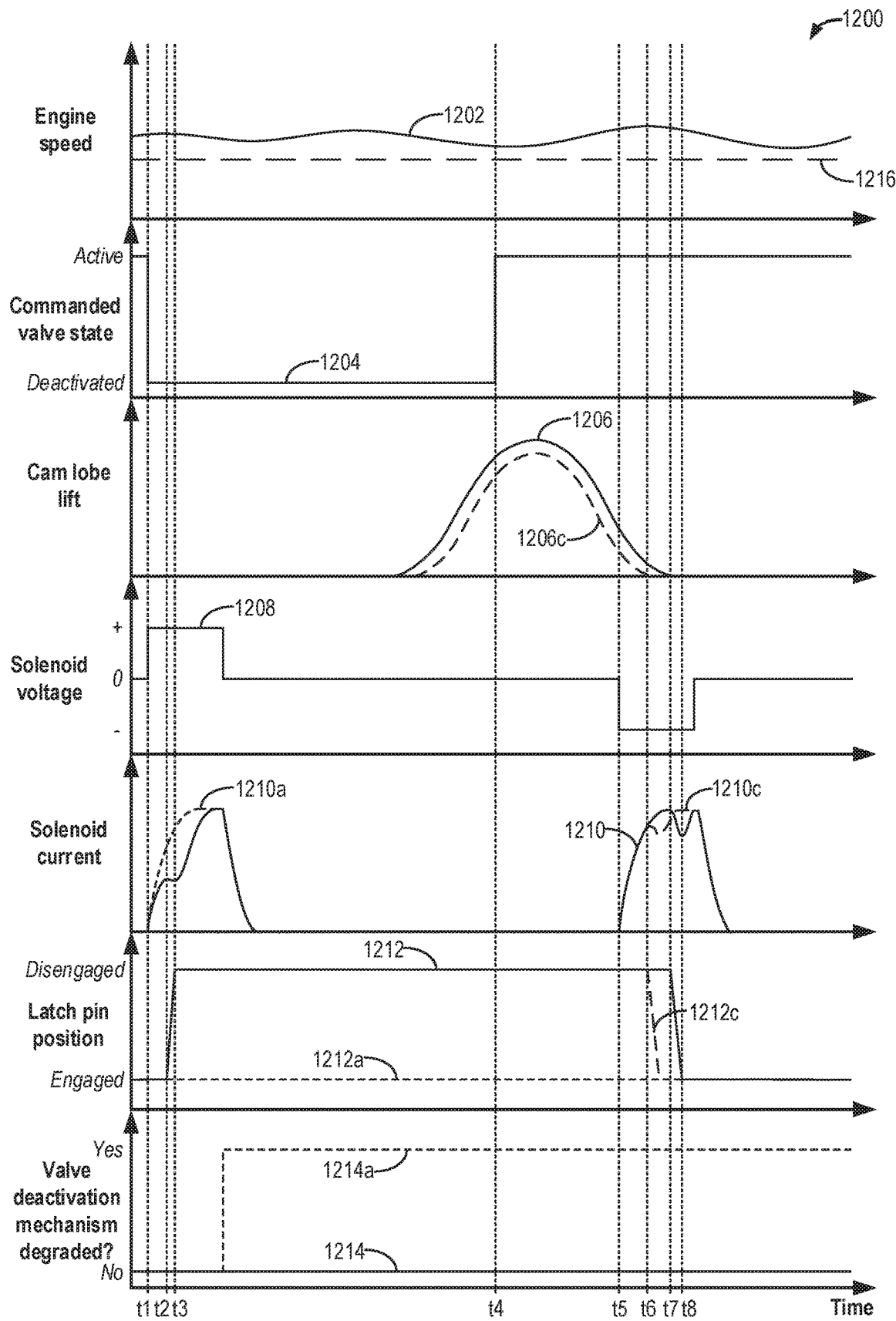
FIG. 12 depicts a prophetic example of transitioning an engine to and from a VDE mode of operation using an electric latch rocker arm mechanism and diagnosing the electric latch rocker arm mechanism during the transition.

FIG. 12 shows an example graph 1200 of diagnosing a cylinder valve deactivation mechanism during an engine transition to and from a VDE mode of operation. For example, the engine may be transitioned between the VDE mode of operation and a non-VDE mode of operation according to the method of FIG. 5, and the cylinder valve deactivation mechanism may be diagnosed according to the method of FIGS. 6A-6B. Engine speed is shown in plot 1202, a commanded valve state is shown in plot 1204, cam lobe lift is shown in plot 1206, solenoid voltage is shown in plot 1208, solenoid current is shown in plot 1210, a position of a latch pin is shown in plot 1212, and an indication of valve deactivation mechanism degradation is shown in plot 1214. For all of the above, the horizontal axis represents time, with time increasing along the horizontal axis from left to right. The vertical axis represents each labeled parameter, with a value of each labeled parameter increasing along the vertical axis from bottom to top, with the exceptions of plot 1204, in which the vertical axis shows the commanded valve state (e.g., "active" or "deactivated," as labeled), and plot 1212, in which the vertical axis shows the latch pin position (e.g., "engaged" or "disengaged," as labeled)), and plot 1214, in which the vertical axis shows whether degradation is indicated (e.g., "yes" or "no"). In the example of graph 1200, the commanded valve state (plot 1204), cam lobe lift (plot 1206), solenoid voltage (plot 1208), solenoid current (plot 1210), and latch pin position (plot 1212), and indication of valve deactivation mechanism degradation (plot 1214) are shown for a single valve, which may be a cylinder exhaust valve or a cylinder intake valve. It should be understood that a plurality of valves may be controlled simultaneously and operated similarly.

Prior to time t1, the engine is on and operating at a non-zero speed (plot 1202) that is greater than a threshold speed for performing a low speed VDE mechanism diagnostic, indicated by a dashed line 1216. Therefore, valve deactivation mechanisms (such as valve deactivation mechanism 252 of FIGS. 2A-2D) may be diagnosed when a valve change of state is commanded and not when a valve change of state is not commanded. Also prior to time t1, the valve is in an active commanded valve state (plot 1204). A latch pin of the valve deactivation mechanism (e.g., latch pin 214 of FIGS. 2A-2D) is in an engaged position (plot 1212), enabling the valve to open as a result of cam lobe lift (plot 1206), as described with respect to FIG. 2C.

At time t1, valve deactivation is commanded (plot 1204), such as to operate the engine in the VDE mode. In response to the change in the commanded valve state, a solenoid of the valve deactivation mechanism (e.g., solenoid 216 of FIGS. 2A-2D) is energized with a voltage pulse having a first (e.g., positive) polarity (plot 1208). As the solenoid is energized, the solenoid current increases (plot 1210), generating an inductive signature. As the solenoid current increases, a magnetic field of the solenoid expands and acts on the latch pin. Because the cam lobe lift is zero, indicating that the cam is on its base circle (e.g., base circle 151a shown in FIGS. 2A-2D), the corresponding latch pin is expected to move due to a force of the magnetic field.

During the energization, at time t2, the solenoid current (plot 1210) begins to decrease (e.g., a slope of the current changes), signifying movement of the latch pin. At time t3, the solenoid current (plot 1210) reaches a local minimum, indicating that the latch pin has completed its movement from the engaged to a disengaged position (plot 1212). Thus, characteristics of the solenoid current (plot 1210) show an inductive signature indicative of latch pin movement, as expected, and valve deactivation mechanism degradation is not indicated (plot 1214).

After time t3, the solenoid current (plot 1210) increases until a maximum current is reached and then decays following completion of the voltage pulse (plot 1208). With the latch pin in the disengaged position, the corresponding valve is deactivated and will not open in response to cam lobe lift, as described with respect to FIG. 2D. A duration between time t1 and time t3 corresponds to a solenoid response time (e.g., an amount of time it takes from energizing the solenoid to the latch pin completing its movement). A controller may learn the solenoid response time for part-to-part adaptation and operating in an increased RPM range, as described with respect to FIG. 6A.

However, if the valve deactivation mechanism is degraded, the inductive signature of the solenoid current may indicate that the latch pin has not moved in response to the solenoid energization, such as shown in short-dashed segment 1210a. In short-dashed segment 1210a, the solenoid current increases until the maximum is reached, without decreasing at time t2 and without reaching the local minimum at time t3. As such, the inductive signature of the solenoid indicates no latch pin movement despite the latch pin being moveable (e.g., the cam lobe lift is zero). The latch pin is stuck in the engaged position (short-dashed segment 1212a), and degradation of the valve deactivation mechanism is indicated (short-dashed segment 1214a).

At time t4, valve activation is commanded (plot 1204). For example, the engine may be transitioning to a non-VDE mode of operation. While the valve activation is commanded, the cam lobe lift (plot 1206) is near a maximum lift. With the cam lobe lift near the maximum lift, a corresponding rocker arm is loaded, and latch pin movement is not expected in response to solenoid energization. Therefore, the controller may wait until the cam is near the base circle to begin the energization.

At time t5, as the cam lobe lift decreases (plot 1206) and approaches a return to its base circle, the solenoid is energized with a voltage pulse having a second (e.g., negative) polarity (plot 1208) such that the latch pin may be pulled to the engaged position as soon as the cam returns to the base circle and the associated rocker arm becomes unloaded. At time t7, the solenoid current begins to decrease (plot 1210) as the cam lobe reaches base circle and the latch pin begins to move. The controller may log a cam angle at time t7 to confirm the cam position. At time t8, the local minimum in the solenoid current (plot 1210) shows that the latch pin has completed its movement back to the engaged position (plot 1212). Because the latch pin moved when the cam returned to base circle (e.g., a cam lobe lift of zero), as expected, valve deactivation mechanism degradation is not indicated (plot 1214).

If the solenoid current decreases sooner than expected at time t6, as shown in dashed segment 1210c, a worn cam lobe may be detected. The worn cam lobe results in a smaller cam lobe lift and a quicker return to base circle, as shown by dashed segment 1206c, and an earlier transition of the latch pin from the disengaged to the engaged position (dashed segment 1212c). In response to the detection of the worn cam lobe, the controller may preferentially deactivate the corresponding cylinder, as described with respect to FIG. 6A. In this way, degradation of the valve deactivation mechanism and the cam itself may be identified.

Figure 13:
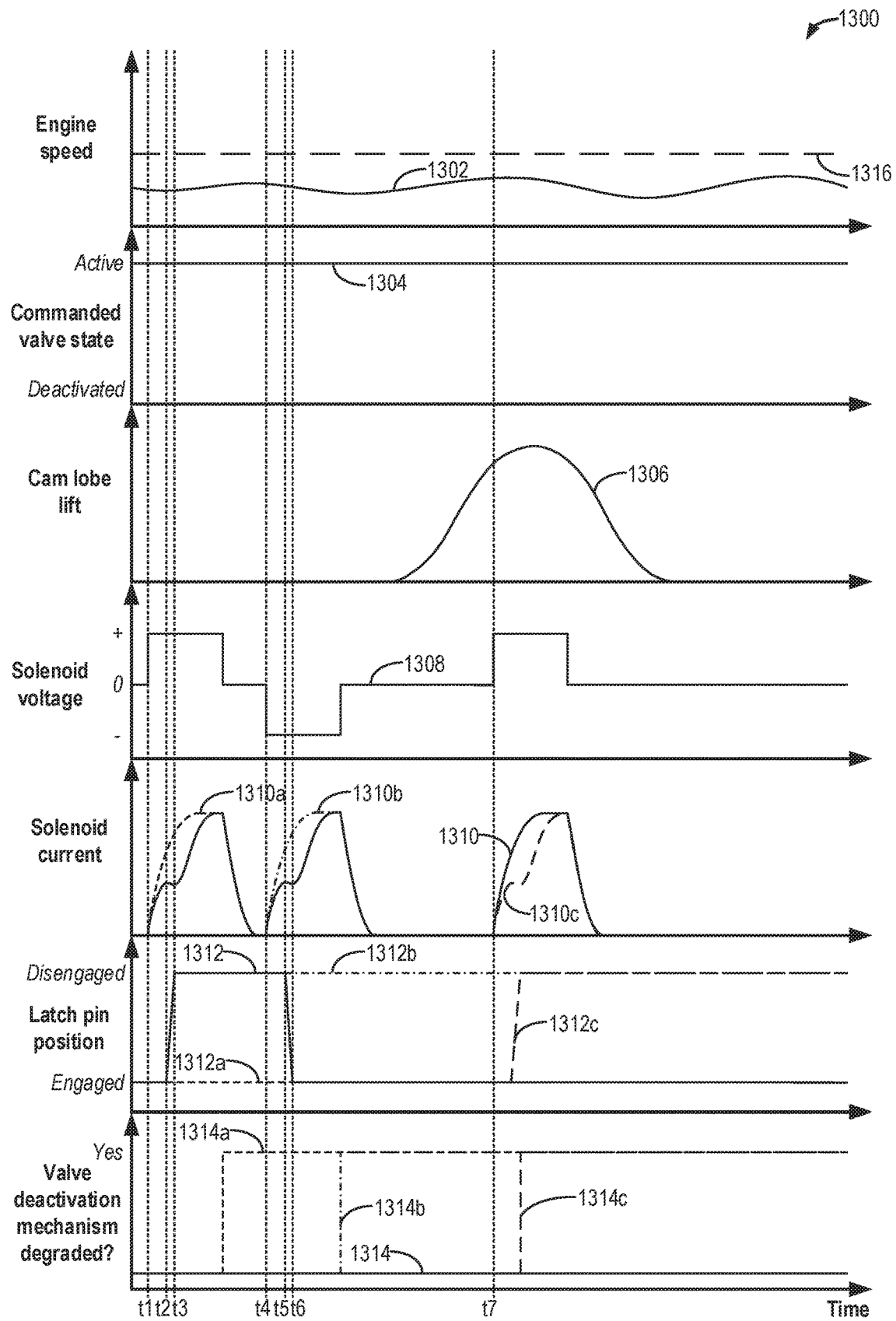
FIG. 13 depicts a prophetic example of diagnosing an electric latch rocker arm mechanism during low engine speed conditions.

Next, FIG. 13 shows an example graph 1300 of diagnosing a cylinder valve deactivation mechanism during low speed engine operation and without a commanded change in valve operating state, such as according to the method of FIG. 7. Engine speed is shown in plot 1302, a commanded valve state is shown in plot 1304, cam lobe lift is shown in plot 1306, solenoid voltage is shown in plot 1308, solenoid current is shown in plot 1310, a position of a latch pin is shown in plot 1312, and an indication of valve deactivation mechanism degradation is shown in plot 1314. For all of the above, the horizontal axis represents time, with time increasing along the horizontal axis from left to right. The vertical axis represents each labeled parameter, with a value of each labeled parameter increasing along the vertical axis from bottom to top, with the exceptions of plot 1304, in which the vertical axis shows the commanded valve state (e.g., "active" or "deactivated," as labeled), plot 1312, in which the vertical axis shows the latch pin position (e.g., "engaged" or "disengaged," as labeled), and plot 1314, in which the vertical axis shows whether degradation is indicated (e.g., "yes" or "no"). In the example of graph 1300, the commanded valve state (plot 1304), cam lobe lift (plot 1306), solenoid voltage (plot 1308), solenoid current (plot 1310), latch pin position (plot 1312), and indication of valve deactivation mechanism degradation (plot 1314) are shown for a single valve, which may be a cylinder exhaust valve or a cylinder intake valve. It should be understood that a plurality of valves may be simultaneously operated similarly.

Prior to time t1, the engine is on and operating at a non-zero speed (plot 1302) that is less than a threshold speed for performing a low speed VDE mechanism diagnostic, indicated by a dashed line 1316. Therefore, valve deactivation mechanisms (such as valve deactivation mechanism 252 of FIGS. 2A-2D) may be diagnosed when a valve change of state is not commanded. Also prior to time t1, the valve is in an active commanded valve state (plot 1304). A latch pin of the valve deactivation mechanism (e.g., latch pin 214 of FIGS. 2A-2D) is in an engaged position (plot 1312), enabling the valve to open as a result of cam lobe lift (plot 1306), as described with respect to FIG. 2C.

At time t1, the cam lobe lift is zero (plot 1306), indicating that the cam is on its base circle (e.g., base circle 151a shown in FIGS. 2A-2D). Due to the low engine speed, there is enough time to actuate the latch pin from the engaged position, to a disengaged position, and back to the engaged position before the cam rotates off of the base circle and onto its lobe (e.g., lobe 151b shown in FIGS. 2A-2D). In order to check the valve deactivation mechanism for degradation, a solenoid of the valve deactivation mechanism (e.g., solenoid 216 of FIGS. 2A-2D) is energized with a voltage pulse of a first (e.g., positive) polarity (plot 1308). As the solenoid is energized, the solenoid current increases (plot 1310), generating an inductive signature. As the solenoid current increases, a magnetic field of the solenoid expands and acts on the latch pin. Because the cam lobe lift is zero and a corresponding e-latch rocker arm mechanism is unloaded, the latch pin is expected to move due to a force of the magnetic field.

During the energization, at time t2, the solenoid current (plot 1310) begins to decrease (e.g., a slope of the current changes), signifying movement of the latch pin. At time t3, the solenoid current (plot 1310) reaches a local minimum, indicating that the latch pin has completed its movement from the engaged to the disengaged position (plot 1312). Thus, characteristics of the solenoid current (plot 1310) show an inductive signature indicative of latch pin movement, as expected, and valve deactivation mechanism degradation is not indicated (plot 1314).

After time t3, the solenoid current (plot 1310) increases until a maximum current is reached and then decays following completion of the voltage pulse (plot 1308). A duration between time t1 and time t3 corresponds to a solenoid response time (e.g., an amount of time it takes from energizing the solenoid to the latch pin completing its movement). A controller may learn the solenoid response time for part-to-part adaptation and operating in an increased RPM range, as described with respect to FIG. 6A. With the latch pin in the disengaged position, the corresponding valve is deactivated and will not open in response to cam lobe lift, as described with respect to FIG. 2D. However, valve deactivation is not desired, as indicated by the commanded valve state remaining active (plot 1304). Therefore, at time t4, the solenoid is re-energized with a voltage pulse of a second (e.g., negative) polarity to move the latch pin back to the engaged position. Movement of the latch pin from the disengaged to the engaged position is confirmed by the inductive signature of the solenoid current (plot 1310) showing the characteristic current decrease at time t5 and local minimum at time t6 as the latch pin completes its movement to the engaged position (plot 1312). With the latch pin successfully returned to the engaged position, valve deactivation mechanism degradation is not indicated (plot 1314).

However, if the valve deactivation mechanism is degraded, the inductive signature of the solenoid current may indicate that the latch pin has not moved in response to the solenoid energization, such as shown in short-dashed segment 1310a (e.g., during the voltage pulse of the first polarity) and dot-dashed segment 1310b (e.g., during the voltage pulse of the second polarity). In short-dashed segment 1310a, the solenoid current increases until the maximum is reached, without decreasing at time t2 and without reaching the local minimum at time t3. As such, the inductive signature of the solenoid indicates no latch pin movement despite the latch pin being moveable (e.g., the cam lobe lift is zero, as shown in plot 1306). The latch pin is stuck in the engaged position (short-dashed segment 1312a), and degradation of the valve deactivation mechanism degradation is (short-dashed segment 1314a). Similarly, in dot-dashed segment 1310b, the solenoid current increases until the maximum is reached, without decreasing at time t5 and without reaching the local maximum at time t6. As such, the inductive signature of the solenoid indicates no latch pin movement despite the latch pin being moveable. The latch pin is stuck or already in the engaged position. If the trace 1310 had been followed between time t1 and time t4, indicating that the latch pin successfully disengaged, then it can be concluded that trace 1310b indicates that the latch pin is stuck in the disengaged position, and degradation of the valve deactivation mechanism is indicated (dot-dashed segment 1314b). If however, trace 1310a had been followed between time t1 and time t4, then the latch pin did not move to the disengaged position during that time. Trace 1310b would then indicate that the latch pin is still stuck in the engaged position.

The cam lobe lift (plot 1306) is on lift at time t7. With the cam lobe lifted, a corresponding rocker arm is loaded, and latch pin movement is not expected in response to solenoid energization. At time t7, the solenoid is energized with a voltage pulse of the first polarity to check the valve deactivation mechanism for degradation, such as to see if the latch pin is held in the engaged position while the rocker arm is loaded. During the energization, the solenoid current (plot 1310) increases until the maximum current is reached and without decreasing. Thus, the inductive signature indicates that the latch pin has not moved and remains in the engaged position (plot 1312), as expected, and degradation of the valve deactivation mechanism is not indicated (plot 1314). However, if the inductive signature shows the characteristic decrease and local minimum indicative of latch pin movement, as in dashed segment 1310c, it may be inferred that the latch pin unexpectedly moved to the disengaged position (dashed segment 1312c). In response to the inductive signature indicating latch pin movement while the cam is lifted, valve deactivation mechanism degradation is indicated (dashed segment 1314c).

Figure 14:
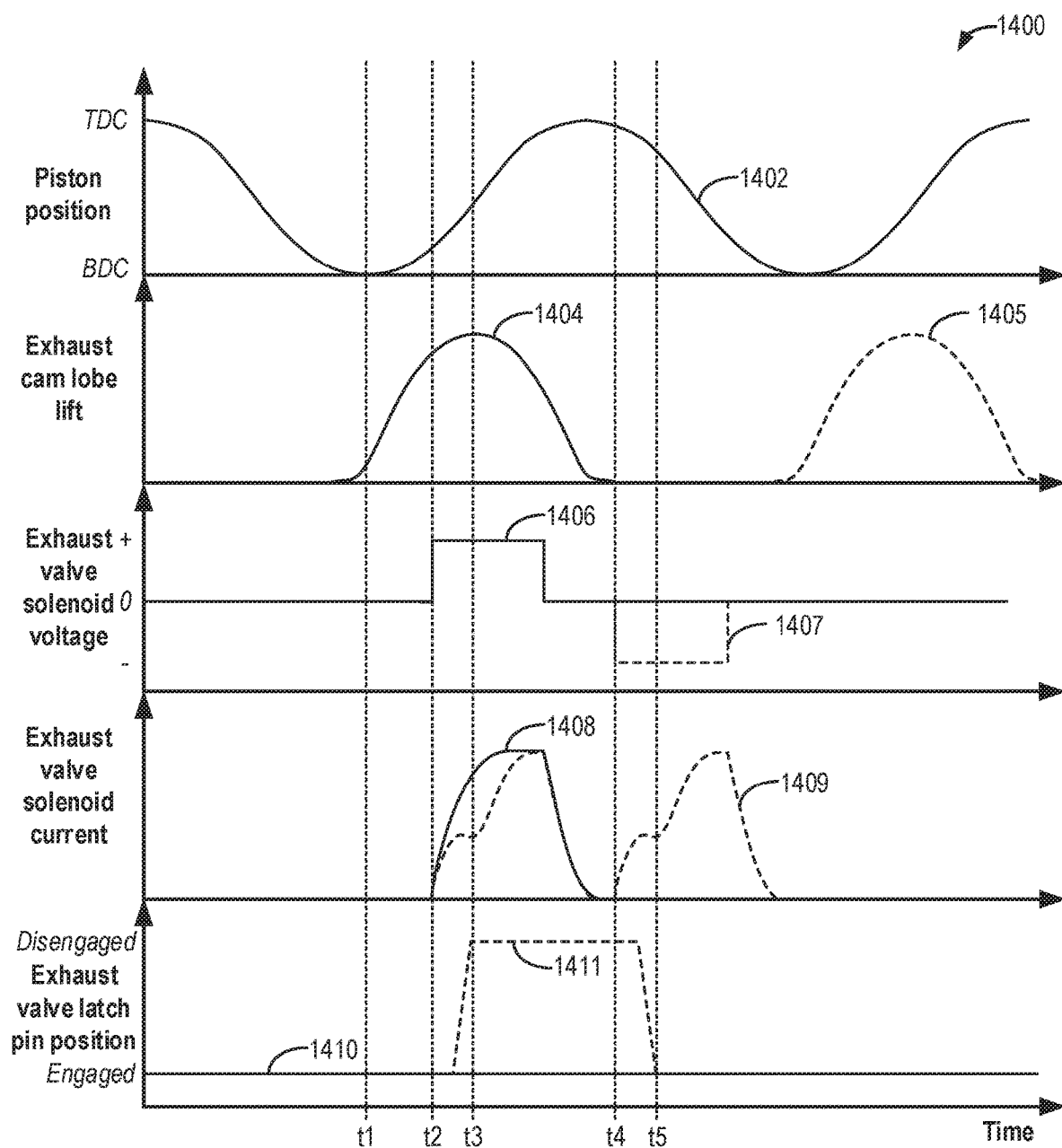
FIG. 14 depicts a prophetic example of determining a camshaft position via an electric latch rocker arm mechanism when a crankshaft position is known.

Next, FIG. 14 shows an example graph 1400 of determining camshaft position based on an inductive signature of an e-latch rocker arm mechanism solenoid when a crankshaft position is known, such as according to the method of FIG. 9. Piston position is shown in plot 1402, exhaust cam lobe lift for a first example is shown in plot 1404, exhaust valve solenoid voltage for the first example is shown in plot 1406, exhaust valve solenoid current for the first example is shown in plot 1408, and a position of a latch pin for the first example is shown in plot 1410. For comparison, exhaust cam lobe lift for a second example is shown in dashed plot 1405, exhaust valve solenoid voltage for the second example is shown in dashed plot 1407, exhaust valve solenoid current for the second example is shown in dashed plot 1409, and a position of a latch pin for the second example is shown in plot 1411. For all of the above, the horizontal axis represents time, with time increasing along the horizontal axis from left to right. The vertical axis represents each labeled parameter, with a value of each labeled parameter increasing along the vertical axis from bottom to top, with the exception of plots 1410 and 1411, in which the vertical axis shows the latch pin position (e.g., "engaged" or "disengaged," as labeled). Piston position (plot 1402) is shown with respect to bottom dead center (BDC) and top dead center (TDC).

At time t1, a controller (e.g., controller 12 of FIG. 1) determines a BDC position of a cylinder based on an output of a crankshaft position sensor (not shown). However, the camshaft position is unknown, and so the controller does not know if the piston is at BDC of an intake stroke or a power stroke. That is, the controller does not know if the exhaust cam of the cylinder has a lift profile shown in plot 1404 or dashed plot 1405.

A latch pin of the exhaust valve e-latch rocker arm mechanism (e.g., latch pin 214 of FIGS. 2A-2D) is known to be in the engaged position (plot 1410). As the piston rises in an upstroke, at time t2, the exhaust valve e-latch solenoid is energized with a voltage pulse having a first (e.g., positive) polarity (plot 1406) to attempt to move the latch pin from the engaged to the disengaged position. The resulting solenoid current is monitored for moment of the associated latch pin. In the first example, the cylinder is in an exhaust stroke, and the exhaust cam lobe is lifted (plot 1404). With the exhaust cam lobe lifted, the corresponding exhaust valve e-latch rocker arm mechanism is loaded, preventing the latch pin from moving. The solenoid current (plot 1408) increases until a maximum current is reached, generating an inductive signature indicative of no latch pin movement. Because no latch pin movement is detected during the solenoid energization, it is inferred that the exhaust valve latch pin remains in the engaged position (plot 1410) and that the cylinder is in an exhaust stroke. The identification of the exhaust stroke enables the controller to determine the orientation of the camshaft relative to the known crankshaft position.

In the second example, the cylinder is in a compression stroke when the exhaust valve solenoid is energized at time t2. With the cylinder in the compression stroke, the exhaust cam is on its base circle, with a lobe lift of zero at time t2 (dashed plot 1405). The exhaust valve rocker arm mechanism is unloaded, allowing the latch pin to move in response to the solenoid energization. The solenoid current increases and then momentarily decreases until a local minimum is reached at time t3 (dashed plot 1409), indicating that the latch pin has moved from the engaged to the disengaged position (dashed plot 1411). Because latch pin movement is detected during the solenoid energization, it is inferred that the cylinder is in a compression stroke. The identification of the compression stroke enables the controller to determine the orientation of the camshaft relative to the known crankshaft position.

Because valve deactivation is not desired, in the second example, a second voltage pulse of the opposite polarity to the first voltage pulse (dashed plot 1407) is supplied to the exhaust valve solenoid before the exhaust cam moves off of the base circle. As such, the exhaust valve latch pin moves back to the engaged position (dashed plot 1411), as shown by the exhaust valve solenoid current reaching a local minimum at time t5 (dashed plot 1409). In this way, the camshaft position is determined without output of a camshaft position sensor by using the inductive signature of an exhaust valve e-latch solenoid to determine cylinder stroke.

Figure 15:
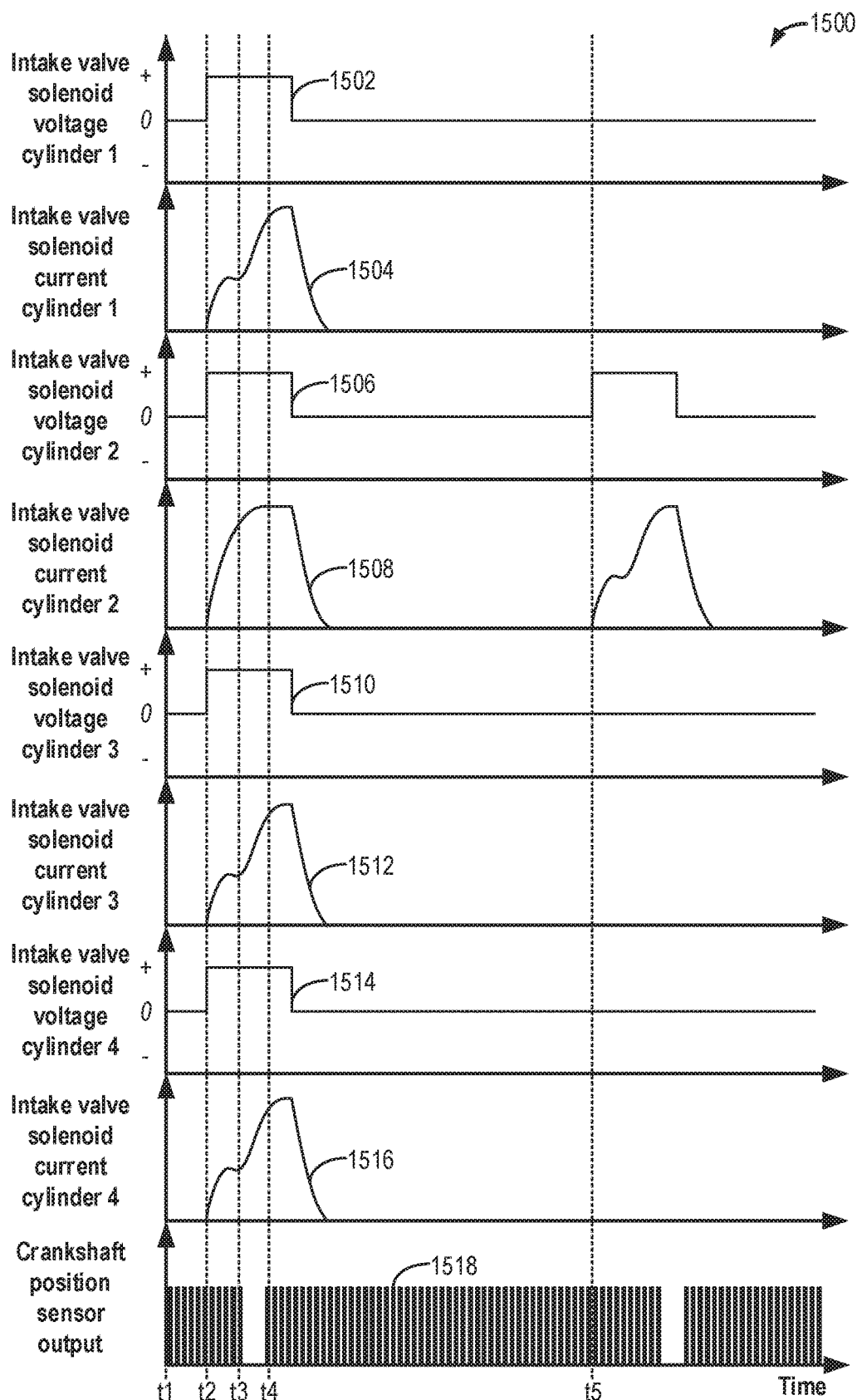
FIG. 15 depicts a prophetic example of determining both crankshaft and camshaft position using an electric latch rocker arm mechanism and output of a crankshaft position sensor.

FIG. 15 shows an example graph 1500 of determining crankshaft and camshaft position in a fixed cam four-cylinder engine based on an inductive signature of an e-latch rocker arm mechanism solenoid and an output of a crankshaft position sensor, such as according to the method of FIG. 10. Although the example of graph 1500 shows using intake valve deactivation mechanisms to determine the crankshaft and camshaft positions, it should be understood that exhaust valve deactivation mechanisms may alternatively be used. Intake valve solenoid voltage of cylinder 1 is shown in plot 1502, intake valve solenoid current of cylinder 1 is shown in plot 1504, intake valve solenoid voltage of cylinder 2 is shown in plot 1506, intake valve solenoid current of cylinder 2 is shown in plot 1508, intake valve solenoid voltage of cylinder 3 is shown in plot 1510, intake valve solenoid current of cylinder 3 is shown in plot 1512, intake valve solenoid voltage of cylinder 4 is shown in plot 1514, intake valve solenoid current of cylinder 4 is shown in plot 1516, and output of a crankshaft position sensor (e.g., Hall effect sensor 120 of FIG. 1) is shown in plot 1518. For all of the above, the horizontal axis represents time, with time increasing along the horizontal axis from left to right. The vertical axis represents each labeled parameter, with the value of the labeled parameter increasing along the vertical axis from bottom to top. In the example of graph 1500, the engine does not include camshaft position sensors.

Prior to time t1, the engine is started from rest, and the crankshaft position and camshaft position are unknown. As such, an engine controller (e.g., controller 12 of FIG. 1) cannot accurately time fuel and spark delivery. Additionally, each intake valve latch pin is known to be in an engaged position (e.g., each intake valve e-latch rocker arm mechanism is latched).

At time t2, the intake valve e-latch solenoid of each cylinder is energized with a voltage pulse of a first (e.g., positive) polarity (plots 1502, 1506, 1510, and 1514). During the energization, the current of each solenoid is monitored for an inductive signature indicative of movement of a corresponding latch pin. At time t3, local minima in the solenoid current of cylinder 1 (plot 1504), the solenoid current of cylinder 3 (plot 1512), and the solenoid current of cylinder 4 (plot 1516) indicate the corresponding latch pins have moved (e.g., from the engaged position to a disengaged position). The steady current increase and lack of local minimum of the solenoid of cylinder 2 indicates that the intake valve latch pin of cylinder 2 has not moved. As such, the controller infers that an intake cam of cylinder 2 is on its lobe, making cylinder 2 in an intake stroke.

Between time t3 and time t4, there is a gap in the crankshaft position sensor output, representing missing teeth on a pulsewheel coupled to the crankshaft. Due to the gap in the output, at time t4, when the square wave signal returns, a crankshaft reference edge is identified (as described with respect to FIG. 8). Due a known relationship between the crankshaft position and the intake stroke of cylinder 2, the controller may infer that the identified crankshaft reference edge is correct and not due to a missed signal. The crankshaft reference edge corresponds to a known rotational orientation of the crankshaft, enabling the crankshaft position to be determined. Further, due to a known relationship between the crankshaft position, cylinder stroke, and the camshaft position, the camshaft position is determined relative to the crankshaft position.

In the example of FIG. 15, intake valve deactivation during the engine start is desired, and the intake valve latch pins of cylinders 1, 3, and 4 have been actuated into the disengaged position, thereby deactivating the corresponding intake valves by time t3. However, the intake valve of cylinder 2 remains in the engaged position. Therefore, while the intake cam of cylinder 2 is on base circle (not shown) at time t5, the intake valve solenoid of cylinder 2 is re-energized with a voltage pulse of the first polarity (plot 1506) in order to move the intake valve latch pin of cylinder 2 to the disengaged position. The latch pin movement is confirmed based on the momentary decrease in the intake valve solenoid current of cylinder 2 (plot 1508) during the energization. However, in other examples, the latch pins of cylinders 1, 3, and 4 may be returned to their starting positions when a change in the valve operational state is not desired.

In this way, by inferring the presence of absence of movement of a latch pin of a cylinder valve deactivation mechanism based on an electric current signature of an associated solenoid, the motion of the latch pin can be correlated with VDE operations. The technical aspect of verifying if a latch pin moved when the associated solenoid was energized is that the cylinder valve deactivation mechanism can be reliably diagnosed with reduced reliance on dedicated sensors. By diagnosing and mitigating issues associated with VDE mechanism degradation in a timely fashion, engine misfire occurrence can be reduced while also extending the fuel economy benefits of VDE operation. By performing the diagnostic during idling conditions following key-on, the diagnostic can be completed before the VDE mechanism is operated on a drive cycle. By additionally or alternatively performing the diagnostic opportunistically over a drive cycle while the VDE mechanism is operated as a function of changing engine speed-load, the diagnostic can be completed without having to intrusively command undesired VDE states. The technical effect of correlating the expected motion of the latch pin with the position of a cam actuating a corresponding cylinder valve is that a camshaft position can be learned with reduced reliance on a camshaft position sensor. In addition, the correlation can be used to identify a piston stroke for a cylinder and infer the state of a corresponding cylinder valve or associated rocker arm. By learning a camshaft and crankshaft timing based on the latch pin movement, fuel can be delivered to an engine more accurately, particularly during an engine restart event. Likewise, by placing valves in a target state during an engine start, such as by placing intake and exhaust valves of at least a first cylinder to fire during an engine restart in a desired state of activation or deactivation, a timing of cylinder fuel delivery can be optimized. By improving engine combustion torque generation, engine startability is improved. By learning camshaft position, crankshaft position, and valve or rocker arm state with reduced need for dedicated sensors, costs can be reduced. In addition, the output of existing sensors can be corroborated. Overall, the performance of an engine configured with selective cylinder deactivation can be improved.

In one example, a method comprises: latching and unlatching an electrically-actuated latch pin of a cylinder valve deactivation mechanism coupled to a valve of a cylinder as engine load varies; and indicating degradation of the cylinder valve deactivation mechanism based on inferred latch pin movement during the latching and unlatching. In the preceding example, additionally or optionally, the latch pin is electrically actuated by a solenoid, the method further comprising, inferring latch pin movement based on an electrical current signature of the solenoid, the electrical current signature including one or more of a position of peaks and valleys of an electrical current of the solenoid, and a slope of the electrical current. In any or all of the preceding examples, additionally or optionally, the latch pin is electrically actuated while a cam coupled to the cylinder valve is at a base circle position. In any or all of the preceding examples, additionally or optionally, the latching and unlatching as engine load varies includes unlatching the latch pin by energizing the solenoid with voltage of a first polarity to deactivate the valve responsive to a lower than threshold engine load, and latching the latch pin by energizing the solenoid with voltage of a second polarity to reactivate the valve responsive to a higher than threshold engine load. In any or all of the preceding examples, additionally or optionally, the indicating includes indicating degradation responsive to an absence of latch pin movement during the latching or the unlatching when the cam is at the base circle position. In any or all of the preceding examples, additionally or optionally, the latching and unlatching is during a drive cycle, the method further comprising: responsive to the indication of degradation when latching is attempted, maintaining the cylinder deactivated over a remainder of the drive cycle; and responsive to the indication of degradation when unlatching is attempted, disabling deactivating the cylinder responsive to lower than threshold engine load later in the drive cycle. In any or all of the preceding examples, additionally or optionally, the latching and unlatching is performed while engine speed is above an idling speed. In any or all of the preceding examples, the method additionally or optionally further comprises learning a plurality of latch pin movement parameters based on the electrical current signature of the solenoid; and adjusting an electrical current applied to the solenoid during a subsequent latching and unlatching of the latch pin based on the learned plurality of latch pin movement parameters. In any or all of the preceding examples, additionally or optionally, the learning includes learning a response time of the solenoid based on the electrical current signature, and wherein the adjusting includes adjusting a timing of energizing the solenoid based on the learned response time. In any or all of the preceding examples, additionally or optionally, the learning includes learning an impact velocity applied by the latch pin to a final position during the latching, and wherein the adjusting includes adjusting a pulse-width signal commanded to energize the solenoid based on the learned impact velocity.

As another example, a method for an engine comprises: energizing a solenoid of a cylinder valve deactivation mechanism to actuate a latch pin to one of an engaged and a disengaged position based on engine load over a drive cycle; diagnosing the valve deactivation mechanism based on latch pin movement, inferred from an inductive signature of the solenoid, while actuating the latch pin; and adjusting an energization current applied to the solenoid based on the diagnosing and further based on the inductive signature. In the preceding example, additionally or optionally, the energizing is performed while a cam coupled to the cylinder valve is at a base circle position, and the energizing includes: responsive to a lower than a threshold engine load, deactivating the cylinder valve by energizing the solenoid with a first polarity of voltage to disengage the latch pin; and responsive to a higher than the threshold engine load, activating the cylinder valve by energizing the solenoid with a second polarity of voltage, opposite of the first polarity of voltage, to engage the latch pin. In any or all of the preceding examples, additionally or optionally, the diagnosing includes: inferring a presence or an absence of the latch pin movement based on the inductive signature of the solenoid, the inductive signature including one or more of a position of current peaks and valleys, and a rate of change of the inductive signature over a time of the energizing the solenoid. In any or all of the preceding examples, additionally or optionally, the diagnosing includes: indicating that the mechanism is degraded responsive to absence of latch pin movement during the energizing; and indicating that the mechanism is not degraded responsive to presence of latch pin movement during the energizing. In any or all of the preceding examples, additionally or optionally, adjusting the energization current includes: responsive to the indication of degradation when the latch pin is in the disengaged position, maintaining the cylinder deactivated over a remainder of the drive cycle; and responsive to the indication of degradation when the latch pin is in the engaged position, maintaining the cylinder active over the remainder of the drive cycle. In any or all of the preceding examples, additionally or optionally, adjusting the energization current includes: advancing a timing of applying the energization current as a response time of the latch pin, inferred from the inductive signature, increases; and decreasing a magnitude of the energization current as a latching force, inferred from the inductive signature, increases.

As another example, an engine system comprises: an engine cylinder including an intake valve; a cam mounted on a camshaft for opening and closing the intake valve; a valve deactivation mechanism coupled to the intake valve, the mechanism including a rocker arm assembly and a latch pin, an inner arm of the rocker arm assembly coupled to the cam via a cam follower and coupled to a stem of the intake valve, an outer arm of the rocker arm assembly coupled to the latch pin, the inner arm engagable to the outer arm via the latch pin; an electric solenoid coupled to the latch pin; an engine speed sensor; and a controller with computer readable instructions that when executed cause the controller to: responsive to a higher than a threshold engine load during a drive cycle, energize the solenoid to actuate the latch pin to a latched position where the inner arm is engaged to the outer arm via the latch pin, and where the cylinder valve can lift via concerted movement of the outer arm and inner arm of the rocker arm assembly; responsive to a lower than the threshold engine load during the drive cycle, energize the solenoid to actuate the latch pin to an unlatched position where the inner arm is disengaged from the outer arm, and where the cylinder valve cannot be lifted; measure an induction current generated by the solenoid upon energization; infer a presence or an absence of movement of the latch pin between the latched position and the unlatched position upon the energization based on the measured induction current; and indicate degradation of the valve deactivation mechanism responsive to the inferred absence of movement of the latch pin. In the preceding example, additionally or optionally, the controller includes further instructions that when executed cause the controller to: responsive to the indication of degradation of the valve deactivation mechanism when the latch pin is in the latched position, maintain the latch pin in the latched position even while the engine load is lower than the threshold engine load. In any or all of the preceding examples, additionally or optionally, the controller includes further instructions that when executed cause the controller to: responsive to the indication of degradation of the valve deactivation mechanism when the latch pin is in the unlatched position, maintain the latch pin in the unlatched position even while the engine load is higher than the threshold engine load. In any or all of the preceding examples, additionally or optionally, the controller includes further instructions that when executed cause the controller to: infer a plurality of latch pin movement parameters based on the induction current, the plurality of parameters including a response time of and a latching force applied by the latch pin; and adjust an energization current applied to the solenoid during subsequent latch pin actuating based on the inferred plurality of latch pin movement parameters, a timing of current application advanced as the response time increases, a magnitude of the current application decreased as the latching force increases.

In another representation, a method for an engine comprises: actuating a latch pin of a valve deactivation mechanism based on engine load; inferring a presence or an absence of latch pin movement during the actuating; and indicating degradation of the cylinder valve deactivation mechanism based on the inferred movement. In the preceding example, additionally or optionally, the valve deactivation mechanism is coupled to a cam-actuated cylinder valve, and actuating the latch pin includes energizing a solenoid coupled to the latch pin with a voltage pulse when the cam is on base circle. In any or all of the preceding examples, additionally or optionally, inferring the presence or the absence of latch pin movement during the actuating is based on a current of the solenoid measured during the energizing. In any or all of the preceding examples, additionally or optionally, inferring the presence or the absence of latch pin movement during the actuating based on the current of the solenoid measured during the energizing comprises: inferring the presence of movement based on a presence of a local minimum in the current as the current increases to a maximum; and inferring the absence of movement based on an absence of the local minimum in the current as the current increases to the maximum. In any or all of the preceding examples, additionally or optionally, actuating the latch pin based on the engine load comprises: actuating the latch pin to an engaged position wherein the cylinder valve is active in response to the engine load meeting or exceeding a threshold; and actuating the latch pin to a disengaged position wherein the cylinder valve is deactivated in response to the engine load decreasing below the threshold. In any or all of the preceding examples, additionally or optionally, indicating degradation of the cylinder valve deactivation mechanism based on the inferred movement comprises: indicating degradation of the valve deactivation mechanism in response to the absence of movement; and not indicating degradation of the valve deactivation mechanism in response to the presence of movement.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   latching and unlatching an electrically-actuated latch pin of a cylinder valve deactivation mechanism coupled to a valve of a cylinder as engine load varies, wherein the latch pin is electrically actuated by a solenoid;
   learning a plurality of latch pin movement parameters based on an electrical current signature of the solenoid;
   indicating degradation of the cylinder valve deactivation mechanism based on the plurality of latch pin movement parameters during the latching and unlatching; and
   adjusting an electrical current applied to the solenoid during a subsequent latching and unlatching of the latch pin based on the learned plurality of latch pin movement parameters.

2. The method of claim 1, wherein the electrical current signature including one or more of a position of peaks and valleys of an electrical current of the solenoid, and a slope of the electrical current.

3. The method of claim 2, wherein the latch pin is electrically actuated while a cam coupled to the cylinder valve is at a base circle position.

4. The method of claim 3, wherein the latching and unlatching as engine load varies includes unlatching the latch pin by energizing the solenoid with voltage of a first polarity to deactivate the valve responsive to a lower than threshold engine load, and latching the latch pin by energizing the solenoid with voltage of a second polarity to reactivate the valve responsive to a higher than threshold engine load.

5. The method of claim 4, wherein the indicating includes indicating degradation responsive to an absence of latch pin movement during the latching or the unlatching when the cam is at the base circle position.

6. The method of claim 5, wherein the latching and unlatching is during a drive cycle, the method further comprising:
   responsive to an indication of degradation when latching is attempted, maintaining the cylinder deactivated over a remainder of the drive cycle; and
   responsive to the indication of degradation when unlatching is attempted, disabling deactivating the cylinder responsive to lower than threshold engine load later in the drive cycle.

7. The method of claim 1, wherein the latching and unlatching is performed while engine speed is above an idling speed.

8. The method of claim 1, wherein the learning includes learning a response time of the solenoid based on the electrical current signature, and wherein the adjusting includes adjusting a timing of energizing the solenoid based on the learned response time.

9. The method of claim 1, wherein the learning includes learning an impact velocity applied by the latch pin to a final position during the latching, and wherein the adjusting includes adjusting a pulse-width signal commanded to energize the solenoid based on the learned impact velocity.

10. A method for an engine, comprising:
    energizing a solenoid of a cylinder valve deactivation mechanism to actuate a latch pin to one of an engaged and a disengaged position based on engine load over a drive cycle;
    learning a plurality of latch pin movement parameters based on an electrical current signature of the solenoid;
    diagnosing the valve deactivation mechanism based on latch pin movement, inferred from the plurality of latch pin movement parameters based on an electrical current signature of the solenoid, while actuating the latch pin; and
    adjusting an energization current applied to the solenoid based on the diagnosing and further based on the electrical current signature.

11. The method of claim 10, wherein the energizing is performed while a cam coupled to the cylinder valve is at a base circle position, and the energizing includes:
    responsive to a lower than a threshold engine load, deactivating the cylinder valve by energizing the solenoid with a first polarity of voltage to disengage the latch pin; and
    responsive to a higher than the threshold engine load, activating the cylinder valve by energizing the solenoid with a second polarity of voltage, opposite of the first polarity of voltage, to engage the latch pin.

12. The method of claim 10, wherein the diagnosing includes:
    inferring a presence or an absence of the latch pin movement based on the electrical current signature of the solenoid, the electrical current signature including one or more of a position of current peaks and valleys, and a rate of change of the electrical current signature over a time of the energizing the solenoid.

13. The method of claim 12, wherein the diagnosing includes:
    indicating that the mechanism is degraded responsive to absence of latch pin movement during the energizing; and
    indicating that the mechanism is not degraded responsive to presence of latch pin movement during the energizing.

14. The method of claim 13, wherein adjusting the energization current includes:

responsive to the indication of degradation when the latch pin is in the disengaged position, maintaining the cylinder deactivated over a remainder of the drive cycle; and responsive to the indication of degradation when the latch pin is in the engaged position, maintaining the cylinder active over the remainder of the drive cycle.

15. The method of claim 12, wherein adjusting the energization current includes:

advancing a timing of applying the energization current as a response time of the latch pin, inferred from the electrical current signature, increases; and decreasing a magnitude of the energization current as a latching force, inferred from the electrical current signature, increases.

16. An engine system, comprising:

an engine cylinder including an intake valve;

a cam mounted on a camshaft for opening and closing the intake valve;

a valve deactivation mechanism coupled to the intake valve, the mechanism including a rocker arm assembly and a latch pin, an inner arm of the rocker arm assembly coupled to the cam via a cam follower and coupled to a stem of the intake valve, an outer arm of the rocker arm assembly coupled to the latch pin, the inner arm engageable to the outer arm via the latch pin;

an electric solenoid coupled to the latch pin;

an engine speed sensor; and a controller with computer readable instructions that when executed cause the controller to:

responsive to a higher than a threshold engine load during a drive cycle, energize the solenoid to actuate the latch pin to a latched position where the inner arm is engaged to the outer arm via the latch pin, and where the cylinder valve can lift via concerted movement of the outer arm and inner arm of the rocker arm assembly;

responsive to a lower than the threshold engine load during the drive cycle, energize the solenoid to actuate the latch pin to an unlatched position where the inner arm is disengaged from the outer arm, and where the cylinder valve cannot be lifted;

measure an induction current generated by the solenoid upon energization;

infer a plurality of latch pin movement parameters based on the induction current, the plurality of parameters including a response time of and a latching force applied by the latch pin;

infer a presence or an absence of movement of the latch pin between the latched position and the unlatched position upon the energization based on the plurality of latch pin movement parameters;

indicate degradation of the valve deactivation mechanism responsive to the inferred absence of movement of the latch pin; and adjust an energization current applied to the solenoid during subsequent latch pin actuating based on the inferred plurality of latch pin movement parameters, a timing of current application advanced as the response time increases, a magnitude of the current application decreased as the latching force increases.

17. The system of claim 16, wherein the controller includes further instructions that when executed cause the controller to:

responsive to the indication of degradation of the valve deactivation mechanism when the latch pin is in the latched position, maintain the latch pin in the latched position even while the engine load is lower than the threshold engine load.

18. The system of claim 16, wherein the controller includes further instructions that when executed cause the controller to:

responsive to the indication of degradation of the valve deactivation mechanism when the latch pin is in the unlatched position, maintain the latch pin in the unlatched position even while the engine load is higher than the threshold engine load.

* * * * *